US011012576B2

(12) United States Patent
Ravichandran

(10) Patent No.: US 11,012,576 B2
(45) Date of Patent: *May 18, 2021

(54) SYSTEMS AND METHODS FOR ENHANCED VIDEO CALL TRANSFER

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/818,422

(22) Filed: Mar. 13, 2020

(65) Prior Publication Data

US 2020/0220977 A1 Jul. 9, 2020

Related U.S. Application Data

(63) Continuation of application No. 16/226,172, filed on Dec. 19, 2018, now Pat. No. 10,630,844.

(51) Int. Cl.
*H04M 3/58* (2006.01)
*H04L 29/06* (2006.01)
(Continued)

(52) U.S. Cl.
CPC .......... *H04M 3/58* (2013.01); *H04L 65/1006* (2013.01); *H04L 65/1096* (2013.01); *H04M 3/5315* (2013.01); *H04N 7/147* (2013.01)

(58) Field of Classification Search
CPC .............. H04L 65/1006; H04L 65/1016; H04L 65/1089; H04L 65/1096; H04L 67/22;
(Continued)

(56) References Cited

U.S. PATENT DOCUMENTS 5,757,781 A 5/1998 Gilman et al.
6,545,697 B1 4/2003 Parker et al.
(Continued)

OTHER PUBLICATIONS

The PCT Search Report and Written Opinion dated Mar. 25, 2020, for PCT Application No. PCT/US2019/064233, 12 pages.
(Continued)

*Primary Examiner* — Gerald Gauthier
(74) *Attorney, Agent, or Firm* — Lee & Hayes, P.C.

(57) ABSTRACT

Systems and methods for providing additional video call transfer functionality are disclosed. The systems and methods can enable a video call between a first user equipment (UE) and a second UE to be transferred to a video call between the second UE and a third UE either a video call or an audio call. The systems and methods can also enable the third UE to accept a transferred video call or to request that the video call be downgraded to an audio call. The systems and methods can incorporate a multimedia resource function (MRF) to connect to the second UE while the transfer is being negotiated and effected. The MRF can provide an audio stream and a video stream to the second UE to provide a "video hold" feature—to prevent the video call from dropping to an audio call automatically or dropping altogether.

20 Claims, 16 Drawing Sheets

(51) Int. Cl.
*H04N 7/14* (2006.01)
*H04M 3/53* (2006.01)

(58) Field of Classification Search
CPC .... H04L 65/403; H04L 69/40; H04M 3/5315; H04M 3/58; H04N 7/147; H04W 24/08; H04W 48/18; H04W 76/00; H04W 76/27
USPC ........... 348/14.02, 14.01; 370/312, 329, 259, 370/328, 352; 379/88.13, 211.02, 93.01; 455/414.1, 462, 445; 709/206, 227, 205; 715/748, 810
See application file for complete search history.

(56) References Cited

U.S. PATENT DOCUMENTS

| | | | |
|---|---|---|---|
| 7,099,288 B1 | 8/2006 | Parker et al. | |
| 7,243,123 B1 | 7/2007 | Allen et al. | |
| 7,440,565 B2 | 10/2008 | McLarty et al. | |
| 7,593,741 B1* | 9/2009 | Amin | H04M 3/58 455/462 |
| 7,962,942 B1 | 6/2011 | Craner | |
| 8,339,437 B2 | 12/2012 | Lin et al. | |
| 9,276,982 B2* | 3/2016 | Cholkar | H04N 21/4788 |
| 9,332,121 B2 | 5/2016 | Yap et al. | |
| 9,367,224 B2* | 6/2016 | Ananthakrishnan | H04L 67/14 |
| 9,544,253 B2* | 1/2017 | Cholkar | H04L 65/1006 |
| 9,732,462 B2 | 8/2017 | Kim et al. | |
| 10,542,137 B1* | 1/2020 | Sial | H04L 65/1069 |
| 10,630,844 B1* | 4/2020 | Ravichandran | H04L 65/1093 |
| 2003/0069934 A1* | 4/2003 | Garcia-Martin | H04L 29/06027 709/206 |
| 2006/0153353 A1 | 7/2006 | O'Neil | |
| 2007/0115940 A1 | 5/2007 | Kamen et al. | |
| 2007/0232343 A1 | 10/2007 | Park et al. | |
| 2008/0153499 A1* | 6/2008 | Lindfors | H04W 76/12 455/445 |
| 2008/0186952 A1* | 8/2008 | Lin | H04L 65/103 370/352 |
| 2009/0136016 A1 | 5/2009 | Gornoi et al. | |
| 2009/0286516 A1* | 11/2009 | Sedlacek | H04L 65/1093 455/414.1 |
| 2010/0066801 A1* | 3/2010 | Zhu | H04L 65/1016 348/14.01 |
| 2010/0279670 A1 | 11/2010 | Ghai et al. | |
| 2011/0058011 A1* | 3/2011 | Kim | H04N 7/142 348/14.02 |
| 2011/0066976 A1* | 3/2011 | Hwang | G06F 3/0486 715/810 |
| 2011/0134804 A1* | 6/2011 | Maes | H04Q 3/0054 370/259 |
| 2011/0292839 A1* | 12/2011 | Swaminathan | H04L 65/1006 370/259 |
| 2011/0310796 A1 | 12/2011 | Um et al. | |
| 2012/0209952 A1 | 8/2012 | Lotfallah et al. | |
| 2013/0077620 A1 | 3/2013 | Nakada et al. | |
| 2013/0159424 A1* | 6/2013 | Georg | H04L 65/1089 709/205 |
| 2013/0219288 A1* | 8/2013 | Rosenberg | H04M 1/006 715/748 |
| 2013/0275615 A1 | 10/2013 | Oyman | |
| 2013/0318248 A1* | 11/2013 | Kim | H04L 65/1016 709/227 |
| 2014/0092841 A1* | 4/2014 | Lee | H04M 3/58 370/329 |
| 2015/0120946 A1 | 4/2015 | Noldus | |
| 2015/0131526 A1* | 5/2015 | Noldus | H04L 65/105 370/328 |
| 2015/0244979 A1 | 8/2015 | Andrada et al. | |
| 2015/0249848 A1 | 9/2015 | Holman | |
| 2015/0350597 A1 | 12/2015 | Lin | |
| 2016/0014061 A1* | 1/2016 | Cholkar | H04L 65/1089 709/206 |
| 2016/0021147 A1* | 1/2016 | Osmond | H04L 65/1016 370/312 |
| 2016/0021151 A1* | 1/2016 | Bain | H04L 65/1006 379/93.01 |
| 2016/0021336 A1* | 1/2016 | Abbott | H04N 7/147 348/14.02 |
| 2016/0036476 A1 | 2/2016 | Cho et al. | |
| 2016/0119481 A1 | 4/2016 | Rein | |
| 2016/0180423 A1 | 6/2016 | Defoy | |
| 2016/0366189 A1* | 12/2016 | Hart | H04L 43/0811 |
| 2017/0208350 A1 | 7/2017 | Herrick et al. | |
| 2018/0027120 A1* | 1/2018 | Peterson | H04M 1/7258 379/211.02 |
| 2018/0041913 A1* | 2/2018 | Zhu | H04L 65/80 |
| 2018/0054852 A1* | 2/2018 | Mohan | H04W 88/04 |
| 2018/0139329 A1* | 5/2018 | Hsu | H04L 65/1083 |
| 2018/0227789 A1* | 8/2018 | Kothapalli | H04L 67/30 |
| 2018/0332084 A1 | 11/2018 | Choe et al. | |
| 2018/0376106 A1 | 12/2018 | Pandey et al. | |
| 2019/0342349 A1 | 11/2019 | Belling | |
| 2020/0220977 A1* | 7/2020 | Ravichandran | H04L 65/1096 |

OTHER PUBLICATIONS

Office Action for U.S. Appl. No. 16/226,172, dated Aug. 28, 2019, Ravichandran, "Systems and Methods For Enhanced Video Call Transfer", 14 pages.

* cited by examiner

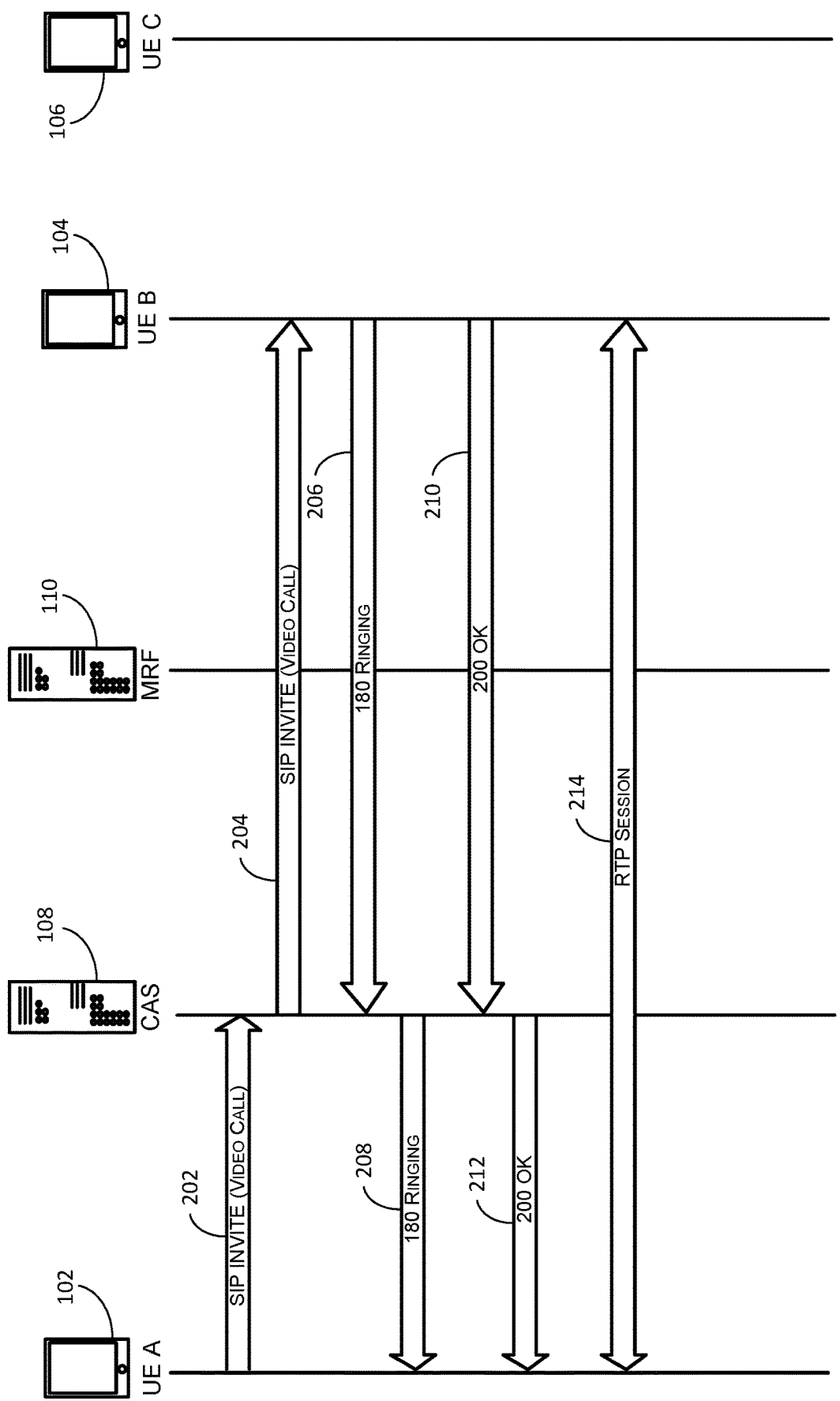

US 11,012,576 B2

SYSTEMS AND METHODS FOR ENHANCED VIDEO CALL TRANSFER

CROSS REFERENCE TO RELATED APPLICATIONS

This is a continuation application which claims priority to commonly assigned, co-pending U.S. patent application Ser. No. 16/226,172, filed Dec. 19, 2018. Application Ser. No. 16/226,172 is fully incorporated herein by reference.

BACKGROUND

Cell phones and smartphones, sometimes referred to as user equipment (UE), are ubiquitous in modern life. UEs can be used to check e-mail, place cellular- and internet-based calls, maintain calendars and provide a myriad of applications. A convenient feature provided by many UEs is the video call. As the name implies, the video call includes both an audio and a video component to enable users to have "face-to-face" discussions. This can be particularly useful for business meetings or for families to stay in touch over long distances (e.g., soldiers on deployment), among other things.

Presently, a video call can be transferred from one UE to another. Due to existing technological limitations, however, little flexibility is provided when transferring video calls. The transferor (the person who is transferring the call) can generally only transfer the call as a video call, for example. Similarly, the transfer target (the person to whom the call is being transferred) is only presented with two choices—accept the video call or decline the call altogether. Thus, neither party is provided with any flexibility when transferring what has already been established as a video call.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is a flowchart depicting an example of a method for connecting two users' equipment (UEs) on a video call, in accordance with some examples of the present disclosure.

DETAILED DESCRIPTION

Examples of the present disclosure can comprise systems and methods for providing enhanced video call transfer functionality. The systems and methods can enable a transferor (a user equipment (UE) of the user who is transferring the video call, referred to below simply as "UE B") to transfer the call as a video call or as an audio-only call (hereinafter, referred to simply as an "audio call")—even when the call is initially established as a video call. The systems and methods can also enable the transfer target (the UE of the user to whom the call is being transferred, referred to below as simply "UE C") to choose between accepting the call as a video call, downgrading to an audio call, or declining the call altogether.

During a video transfer, the transferee (the UE of the person who is being transferred, referred to below as "UE A") can be connected to a multimedia resource function (MRF). The MRF can provide an audio and a video stream to the transferee to prevent the call from dropping to an audio call (or dropping altogether), as would happen if no video stream was provided. The MRF can essentially provide a video "hold message" to the transferee to maintain the video connection with the transferee while the transfer is completed. When the transfer is complete—i.e., the call has been accepted as a video call or an audio call—the transferee can be connected to the transfer target to complete the transfer.

The systems and methods discussed herein are discussed generally with respect to cellular UEs and in terms of components (e.g., network entities) associated with fourth-generation (4G) and fifth-generation (5G) cellular networks. The systems and methods can be used with other types of equipment and on other types of networks, however, where video calls take place and where users may wish to have increased flexibility in transferring video calls. Thus, the systems and methods described herein are described in terms of the 4G and 5G networks merely because these networks represent the state of the current art. One of skill in the art will recognize, however, the systems and methods could also be used on other networks that provide video calling such as, for example, Wi-Fi, Internet of Things (IoT), machine-to-machine (M2M), and other current and future networks.

As mentioned above, the systems and methods enable a user to choose to transfer a current video call to another user as either a video call or an audio call. This may be useful when, for example, the video call was to conduct a meeting, but the transferor is merely transferring the call to an administrative assistant, for example, to schedule a follow-up meeting. Similarly, it would be equally useful for the transfer target to be able to accept the transferred call as either a video call or an audio call. The transfer target may not want, or need, the video component of the call, yet they would nonetheless like to talk to the transferee.

Figure 1A:
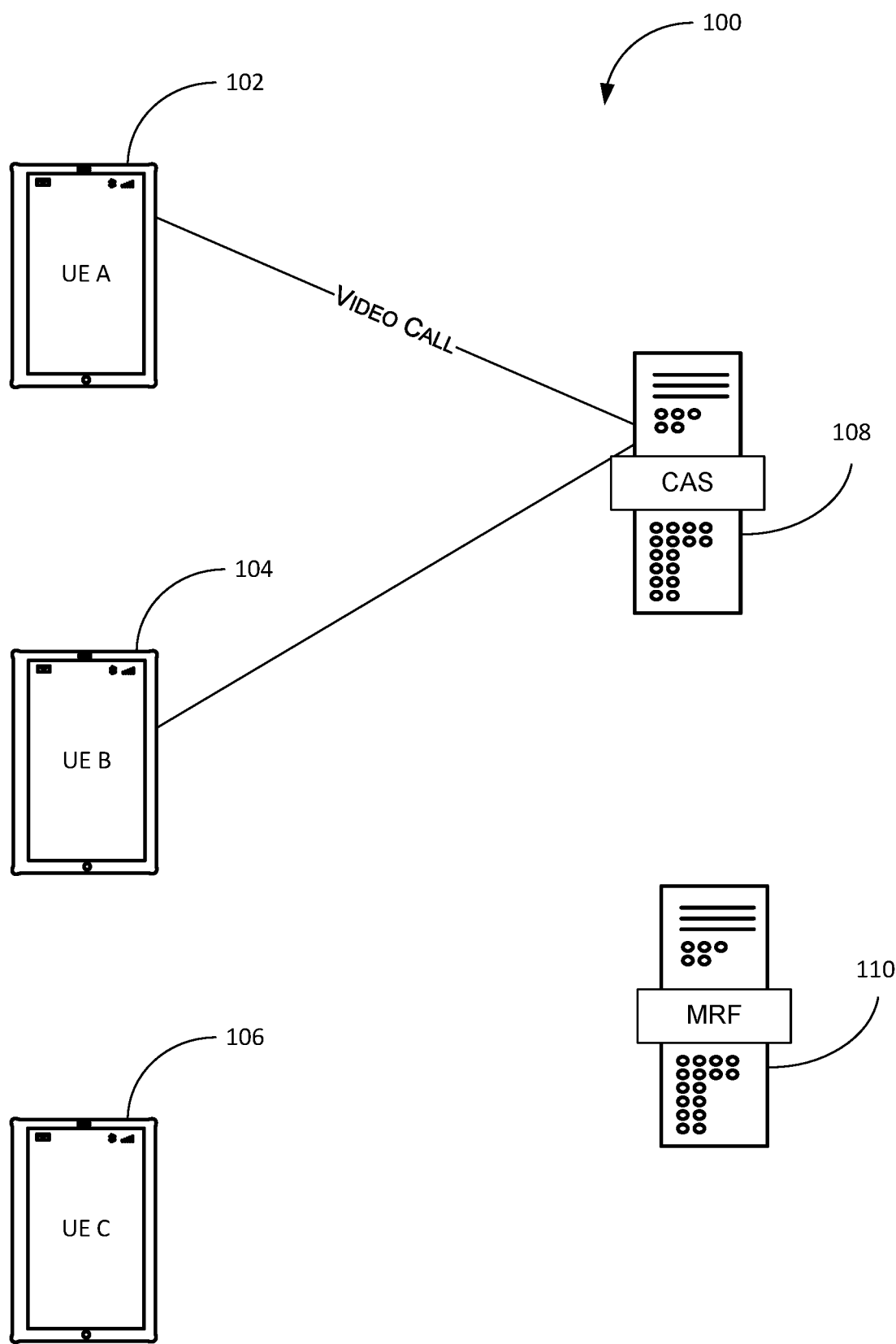
FIGS. 1A-1C depict an example of a system for enabling enhanced video call transfers, in accordance with some examples of the present disclosure.
Figure 1B:
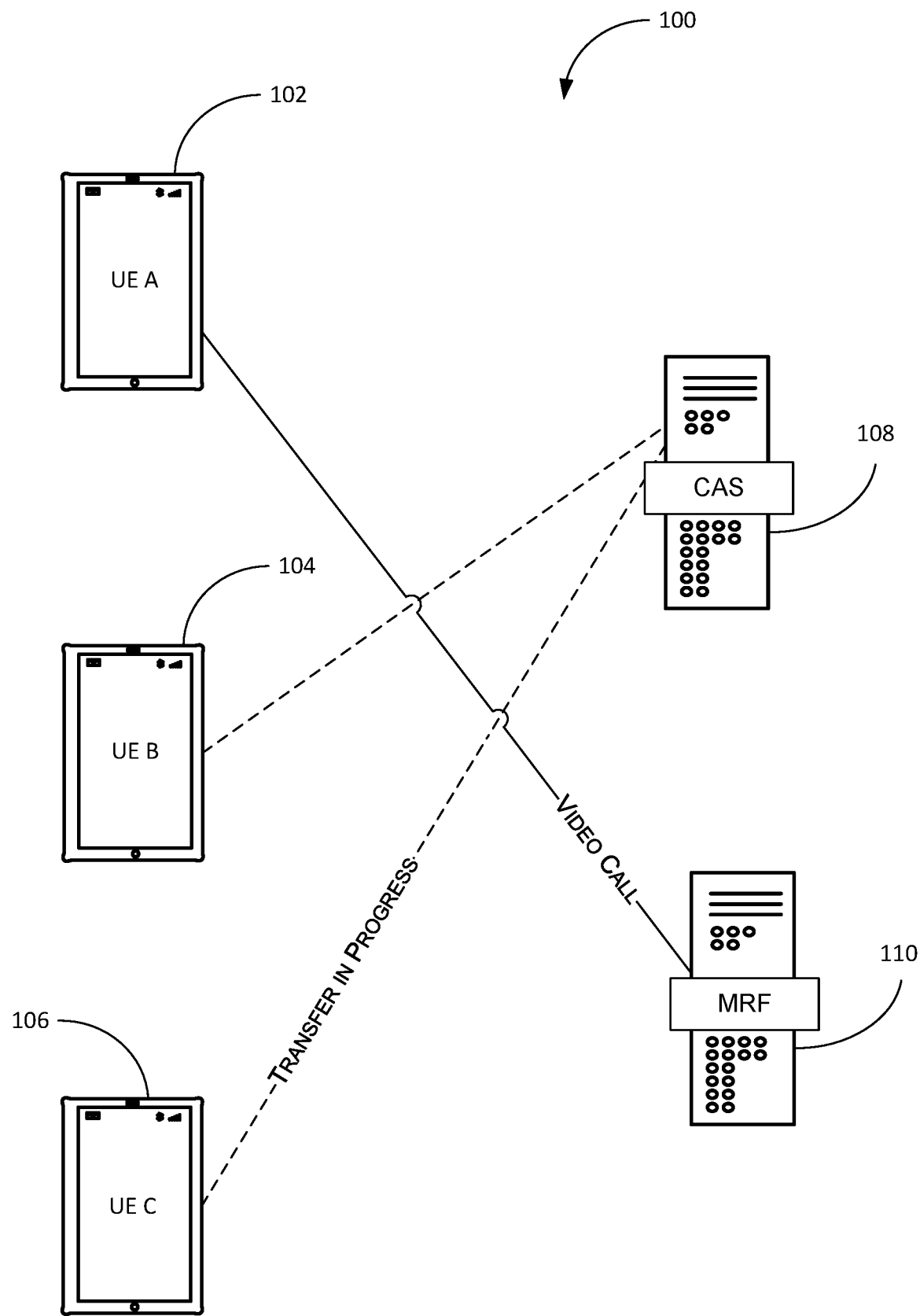
Figure 1C:
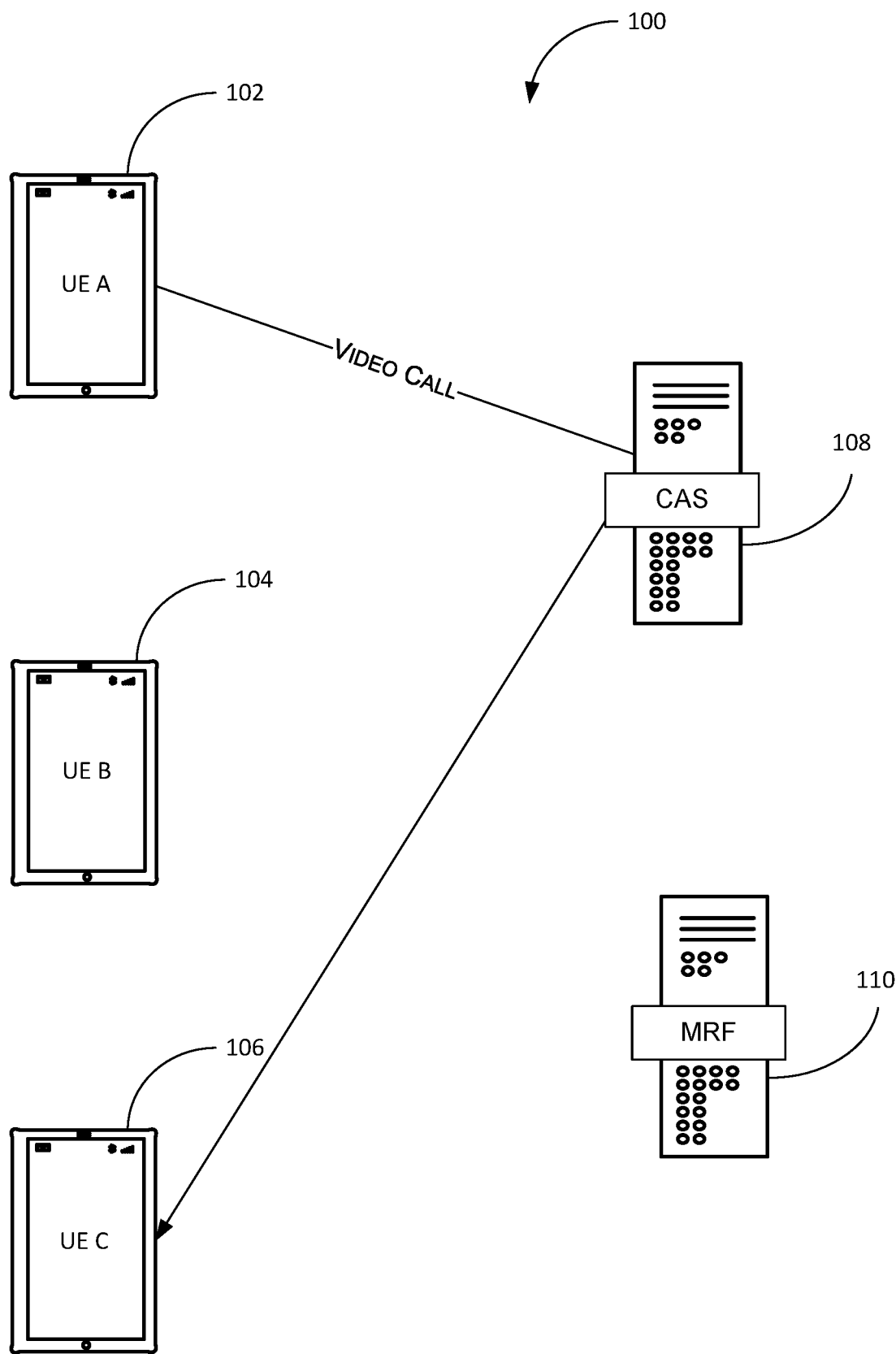

As shown in FIGS. 1A-1C, examples of the present disclosure can comprise a system 100 for providing enhanced video call transfers. The system 100 can enable the transferor to transfer an existing video call as either a video call or an audio call. The system can also enable the transfer target to accept the transfer as a video call or an audio call (or decline the call altogether).

The system 100 can comprises at least three UEs belonging to 1) the transferee (the UE that is being transferred), 2) the transferor (the UE that is making the transfer), and 3) the transfer target (the UE that is receiving the transfer)—or UE A 102, UE B 104, and UE C 106, respectively. Thus, as used herein, UE A 102 can be associated with the transferee (the UE that is being transferred from UE B 104 to UE C 106), UE B 104 can be associated with the transferor (the UE that is transferring UE A 102 to UE C 106), and UE C 106 can be associated with the transfer target (the UE to whom UE A 102 is being transferred by UE B 104).

As shown in FIG. 1, UE A 102 and UE B 104 can initially be connected on a video call, or in some examples, an audio call. Thus, UE A 102 and UE B 104 are connected by a call application server (CAS) 108 that provides an audio and a video connection between UE A 102 and UE B 104. The CAS 108 can be any one of several network entities, discussed by way of example generally below in FIG. 12 as a telephony application server (TAS). As such, the CAS 108 may provide the audio and video codecs, IP addresses or phone numbers, and/or other information to complete the video call.

As shown in FIG. 1B, if UE B 104 now decides to transfer its connection with UE A 102 to UE C 106, UE A 102 can first be connected with an MRF 110. The MRF 110 can comprise a network entity that, in conjunction with a serving-call session control function (S-CSCF) and a TAS (both discussed by way of example in more detail below in FIG. 12), can provide an appropriate audio and/or video stream to UE A 102 to maintain a video call and essentially place UE A 102 on "video hold." Thus, the MRF 110 can provide the necessary audio and/or video codecs and provide what is essentially video hold music—prerecorded (or pregenerated) video and prerecorded (or pregenerated) audio. This can prevent UE A 102 from automatically dropping to an audio call (because no video stream is present), which would could happen otherwise. In some examples, the MRF 110 may provide an actual video with a prerecorded or pregenerated message, a logo, transfer information (e.g., your call will be transferred in 3, 2, 1 . . . ), or other information. In other examples, the MRF 110 can simply provide a black screen, which, while appearing like a blank screen to the user, is actually a video playing a black background to maintain the video connection.

Regardless, while UE A 102 is connected to the MRF 110, UE B 104 can transfer the call to UE C 106 via the CAS 108. This can be done in an "attended" manner or an "unattended" manner as an unattended transfer request. In the attended transfer, UE B 104 is temporarily connected to UE C 106 via the CAS 108. Thus, UE B 104 and UE C 106 can be connected on an audio or video call to enable UE B 104 (or rather, the user thereof) to announce the incoming transfer to the user of UE C 106. This may be useful if an introduction is warranted, for example, if the transferor needs to preface the call in some way, or if the transferor needs to provide any other useful information prior to the transfer taking place.

In an unattended transfer, on the other hand, UE B 104 can simply send the transfer (e.g., a SIP REFER) to the CAS 108 and transfer UE A 102 to UE C 106 unannounced. In this case, the transferee can explain the call to the transfer target upon connection, for example, or the transfer target may be expecting the call (i.e., the transfer is prearranged). So, for example, the transferor may have told an administrative assistant before the initial video call, "I have a call with A today. When we get done, I am going to transfer him/her to you to schedule a follow-up call." Thus, the administrative assistant may already be expecting the transfer, eliminating the need for an introduction.

Regardless of whether the transfer is attended or unattended, the CAS 108 can receive the transfer from UE B 104 and send the transfer to UE C 106. As mentioned above, this may be a SIP REFER, for example, which uses the existing video session between UE A 102 and UE B 104 to establish a video session between UE A 102 and UE C 106. In other examples, such as when a SIP INVITE 15 used, the CAS 108 can simply provide the SIP INVITE to UE C 106 with any necessary codecs, IP addresses, and other relevant information to establish a new video session.

In the meantime, UE A 102 has been "parked" on the MRF 110 awaiting the transfer. The MRF 110 has maintained an open video and/or audio session with UE A 102 while the transfer is in progress. A shown in FIG. 1C, therefore, once the transfer is complete, UE A 102 and UE C 106 are now connected to each other, via the CAS 108, on a video and/or audio call (depending on how the call was transferred and how it was accepted, as discussed below). At this point, UE B 104 and the MRF 110 are no longer involved in the call, as the video and/or audio stream has now been established between UE A 102 and UE C 106.

As shown in FIG. 2, a video call can be established between UE A 102 and UE B 104 via the CAS 108. The CAS 108 can receive SIP messaging from the UEs 102, 104, provide the necessary codec(s), and establish the initial real-time transport protocol (RTP) session between the UEs 102, 104. As discussed below, the CAS 108 can also provide the rerouting necessary to transfer the call from UE B 104 to UE C 106.

At 202, UE A 102 can send a SIP INVITE to the CAS 108 to establish a video call with UE B 104. Thus, the SIP INVITE can include "to" and "from" information including the phone numbers and/or IP addresses for UE A 102 and UE B 104, contact information, allow fields (e.g., ACK, SIP BYE, CANCEL, etc.), and other relevant information. In the case of a video call, the SIP INVITE can also include a request to establish a bidirectional audio and video connection (e.g., Video-SENDRECV; Audio-SENDRECV) to enable audio and video to be sent between UE A 102 and UE B 104.

At 204, the CAS 108 can relay the message to UE B 104 with substantially the same information. The CAS 108 provides the necessary call establishment procedures between the UEs 102, 104. In some cases, the CAS 108 may also provide some negotiation between the UEs 102, 104. If the UEs 102, 104 are capable of using multiple video codecs, for example, the CAS 108 may choose a codec that is usable by both UEs 102, 104 to prevent compatibility issues.

At 206, UE B 104 may optionally respond with a 180 RINGING message. As the name implies, the 180 RINGING message indicates that the call is ringing on UE B 104, but has not yet been answered by the user. At 208, the CAS 108 can relay the 180 RINGING to UE A 102. This may also cause UE A 102 to play the traditional ringing noise (or some other noise) to the user indicating that the call is ringing on UE B 104.

At 210, if after the user accepts the call on UE B 104, then UE B 104 can send an acknowledgment—e.g., a SIP 200 OK—to the CAS 108. This indicates that UE B 104 is physically capable of participating in the requested call—i.e., that UE B 104 has the necessary equipment (e.g., camera, microphone, etc.) and that the equipment is functioning. This also indicates that the requested call format is accepted (e.g., the SIP messages are properly formatted, the codec is acceptable, etc.). This also indicates that the user has accepted the video call by providing the necessary input on UE B 104 (e.g., pressing the "answer" or "accept call" button). At 212, the CAS 108 can relay the SIP 200 OK to UE A 102. At 214, an RTP session is established between UE A 102 and UE B 104.

As mentioned above, if one of the users now wanted to transfer the video call to UE C 106 using current technology, it would have to be transferred as a video call and accepted as a video call. In other words, if UE B 104 transferred the call to UE C 106, UE B 104 does not have the option to transfer the call as an audio call, because the call was established as a video call. Similarly, UE C 106 does not have the option to accept the call as an audio call, only a video call. In this respect, current technology is "all or nothing."

Figure 3:
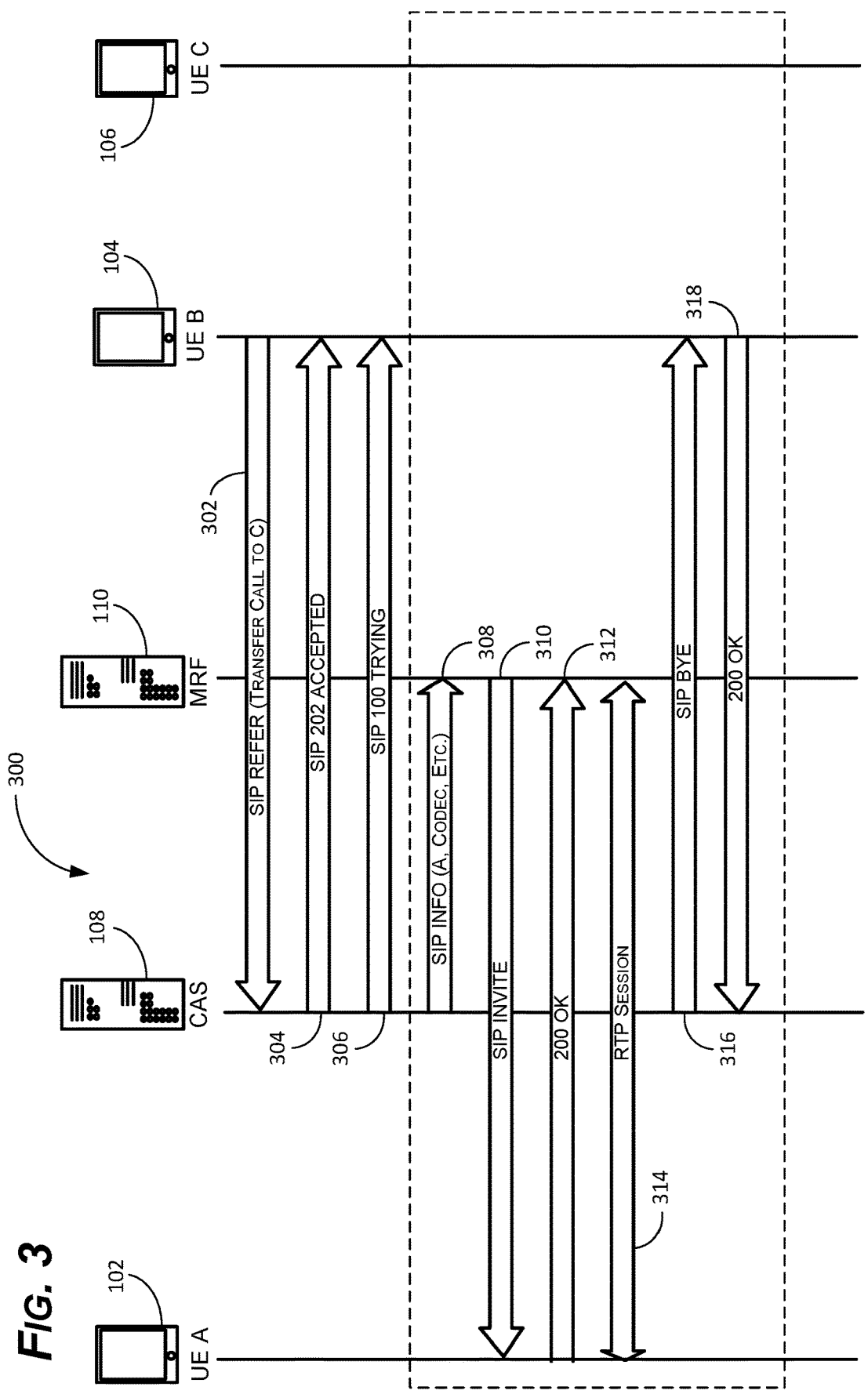
FIG. 3 is a flowchart depicting an example of a method for connecting a UE to a media resource function (MRF) while the UE is being transferred to another UE, in accordance with some examples of the present disclosure.
Figure 4:
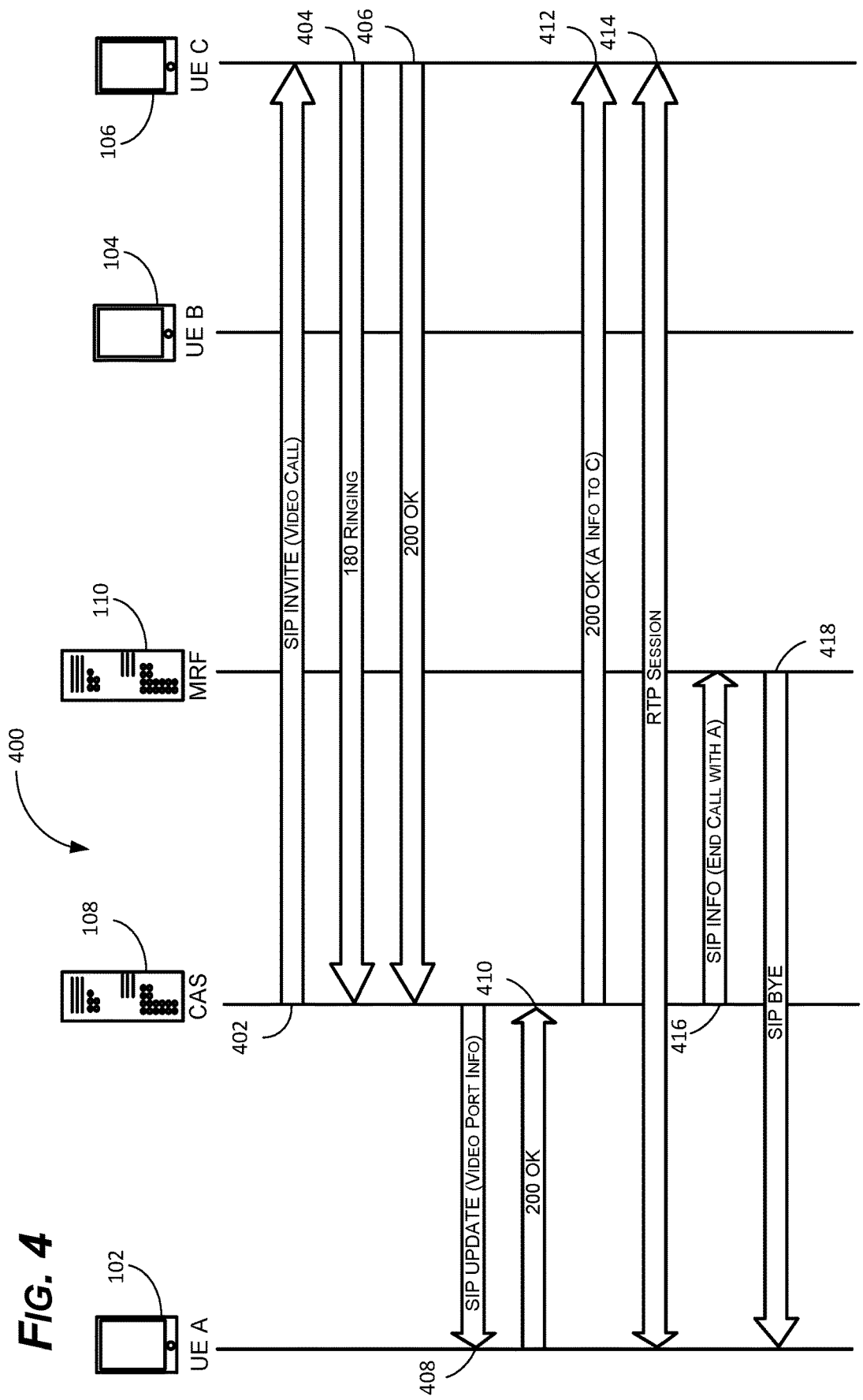
FIG. 4 is a flowchart depicting an example of a method for completing the transfer to the other UE from FIG. 3 and disconnecting from the MRF, in accordance with some examples of the present disclosure.

To this end, as shown in FIGS. 3 and 4, a two-step process can be used to provide improved video call transfers. As discussed above, the system 100 can introduce an MRF 110 to maintain a video connection with the transferee while the call is being transferred. If the call is established, transferred, and accepted as a video call, the MRF 110 can maintain the video and audio channel with the transferee until the video call can be established between the transferee and the transfer target. The introduction of the MRF 110, however, also enables the call to be sent and/or accepted as an audio call, with the call dropping down to an audio call upon establishment of the session between the transferee and the transfer target.

As shown in FIG. 3, a first part of the two-step process can comprise a method 300 for temporarily establishing a video call between the transferee and the MRF 110. In this example, UE B 104 (transferor) wishes to transfer UE A 102 (transferee) to UE C 106 (transfer target). To this end, at 302, UE B 104 sends a SIP REFER to the CAS 108. Similar to the SIP INVITE discussed above, the SIP REFER can contain the necessary information related to all three UEs 102, 104, 106 including, for example, phone numbers, IP addresses, codecs, etc. Rather than establishing a new session, as with an SIP INVITE, however, the SIP REFER generally renegotiates the existing session between UE A 102 and UE B 104 to be between UE A 102 and UE C 106 without establishing a new session.

At 304, the CAS 108 can send an acknowledgement—e.g., a 202 ACCEPTED—to UE B 104. This does not indicate that the REFER has been completed, but rather that the CAS 108 understands the request—i.e., it is properly formatted, contains valid addresses, etc. At 306, the CAS 108 can send another message (e.g., 100 TRYING) to UE B 104 to indicate that the CAS 108 is attempting to complete the transfer.

Unlike a conventional transfer, which would go straight to UE C 106, however, in this case, UE A 102 can first be connected to the MRF 110 to maintain the video call. To this end, at 308, the CAS 108 can send a message (e.g., a SIP INFO) to the MRF 110 to cause the MRF 110 to establish an RTP session with UE A 102. As mentioned above, this essentially puts UE A 102 on "video hold" while the rest of the transfer is negotiated. The SIP INFO can include a phone number or IP address for UE A 102, the video codec being used, and any other information needed for the MRF 110 to establish the session with UE A 102.

At 310, armed with the information from the SIP INFO, the MRF 110 can send a SIP INVITE to UE A 102. As before, the SIP INVITE can include the phone number and/or IP address for UE A 102 and the MRF 110. The SIP INVITE can also include the necessary requests (e.g., Audio-SENDRECV, Video-SENDRECV), the codec(s), and other information needed to establish an RTP session. At 312, assuming that all is well with the SIP INVITE, UE A 102 can send an acknowledgement (e.g., a SIP 200 OK) to accept the video call. Optionally, the MRF 110 may send a SIP 200 OK in return (not shown).

At 314, an RTP session is established between UE A 102 and the MRF 110. At this point, the MRF 110 can provide a video and an audio stream to maintain the video call with UE A 102 and to prevent the call from dropping to an audio call. Thus, the MRF 110 may simply provide a video with only a black background, which would appear generally as a blank screen, though the MRF 110 is actually providing a video with all black pixels. In other examples, the MRF 110 can play a hold video telling the user of UE A 102 that the transfer is in progress and to please be patient. In still other examples, the MRF 110 can play an advertisement, live television, or any other video and audio source.

At this point, the MRF 110 is maintaining the connection with UE A 102. At substantially the same time, the CAS 108 is attempting to complete the transfer of UE A 102 to UE C 106. As a result, UE B 104 is no longer needed. To this end, concurrently with, or immediately after establishing the RTP session at step 314, the CAS 108 can terminate the call with UE B 104. In some examples, the CAS 108 can maintain the call with UE B 104 until or at a time before the transfer of the call. At 316, therefore, the CAS 108 can send a message to UE B 104 to disconnect, such as a SIP BYE. At 318, UE B 104 can acknowledge the message with a SIP 200 OK (or similar) and UE B 104 is removed from the call.

As shown in FIG. 4, a second part of the two-step process can comprise a method 400 for completing the transfer to the transfer target. In this example, UE A 102 has already been connected to the MRF 110 on a video call. Thus, all that remains is to connect UE A 102 to UE C 106 and disconnect UE A 102 from the MRF 110.

At 402, the CAS 108 can send a SIP INVITE to UE C 106 requesting a video call. As before, the SIP INVITE can include all of the necessary information including IP addresses, phone numbers, codec(s), etc. The SIP INVITE can also include the request to establish a video and an audio channel (e.g., Video-SENDRECV; Audio-SENDRECV). At 404, UE C 106 can acknowledge receipt of the SIP INVITE by providing a 180 RINGING, or similar. At 406, if the user accepts the video call on UE C 106, UE C 106 can send a SIP 200 OK. As discussed below in FIG. 5, the user may also choose to downgrade to an audio call (or decline the call altogether).

At 408, the CAS 108 can send a SIP UPDATE to UE A 102 with updated information to transfer the video call from being between UE A 102 and the MRF 110 to being between UE A 102 and UE C 106. Thus, the SIP UPDATE may include updated video port information, codec(s), and the IP address or phone number for UE C 106, among other things. At 410, UE A 102 can acknowledge the new information with a SIP 200 OK. Optionally, UE A 102 can provide any updated information (e.g., a different video codec) to the CAS 108 in the SIP 200 OK message.

At 412, the CAS 108 can relay the SIP 200 OK to UE C 106. In this case, the SIP 200 OK can also include the information for UE A 102, including any updated information that may have been provided by UE A 102. At 414, an RTP session is now established between UE A 102 and UE C 106. In this example, a video call with bidirectional video and bidirectional audio is established.

To this end, the session between UE A 102 and the MRF 110 is no longer needed. In some examples, therefore, at 416, the CAS 108 can send a SIP INFO to the MRF 110 to cause the MRF to disconnect from UE A 102. In other examples, UE A 102 (instead of the CAS 108) can send a similar message to the MRF 110 to cause the session to terminate (e.g., a SIP BYE). In either case, at 418, the MRF 110 can send a response (e.g., a SIP BYE) to UE A 102 to terminate the hold video session. At this point, the call has been successfully transferred from between UE A 102 and UE B 104 to between UE A 102 and UEC 106.

Figure 5:
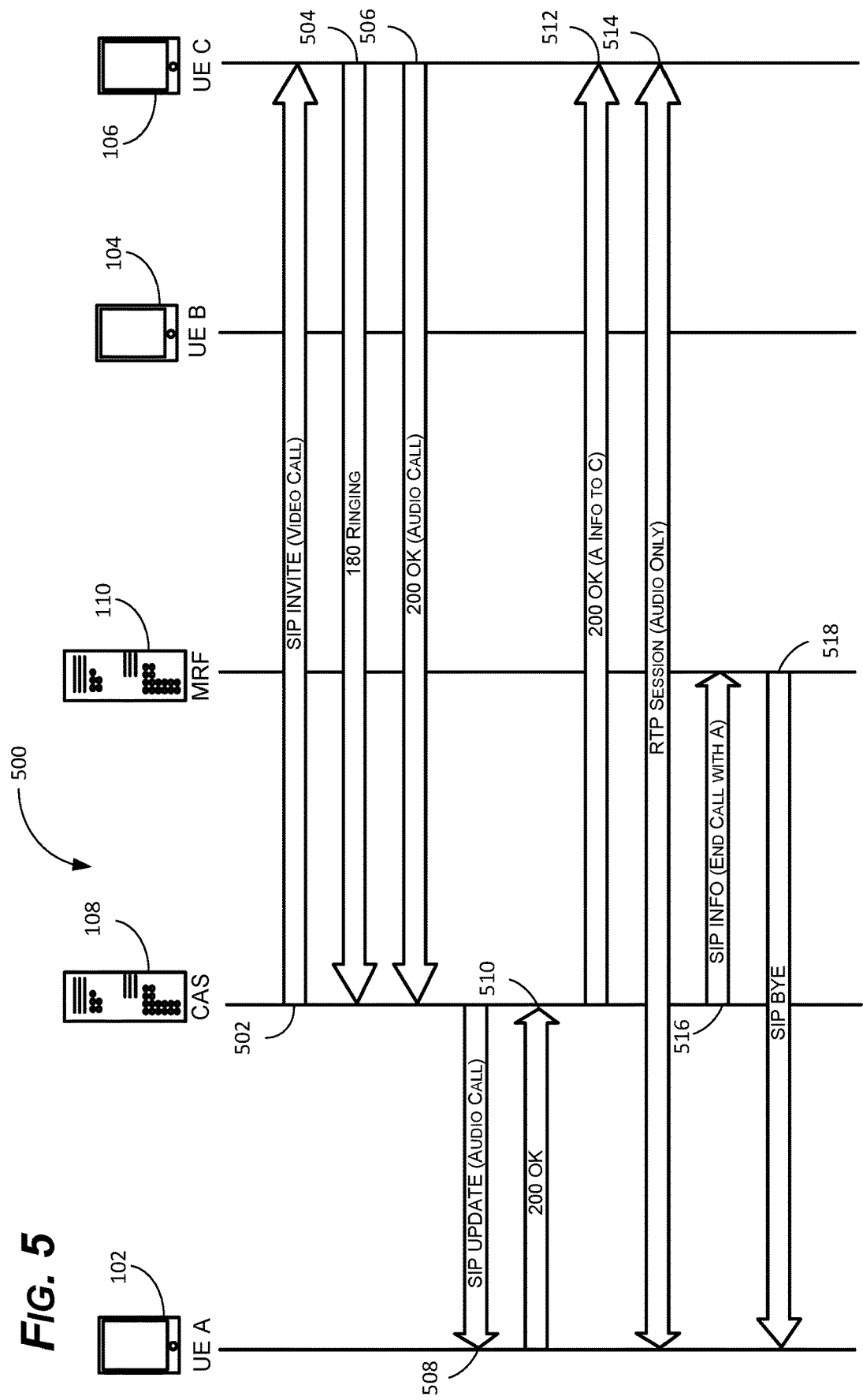
FIG. 5 is a flowchart depicting an example of a method for a UE to downgrade an incoming transfer from a video call to an audio call, in accordance with some examples of the present disclosure.

As shown in FIG. 5, an advantage of the two-step system disclosed herein is that the user of UE C 106 can also choose to downgrade the call to an audio call. In other words, just because UE A 102 and UE B 104 were on a video call does not mean that the user of UE C 106 wants, or needs, to be on a video call with UE A 102. Using conventional technology, however, UE C 106 is not given that option. The only two available options are to accept the video call or decline the video call. Using the two-step method disclosed herein, however, because UE A 102 is temporarily "parked" on the MRF 110, UE C 106 can then choose to downgrade the call without issue. Indeed, the method 500 is similar to the method 400 described above, except that UE C 106 has the opportunity to renegotiate the call in response to the initial SIP INVITE.

At 502, the CAS 108 can send a SIP INVITE to UE C 106 requesting a video call. As before, the SIP INVITE can include necessary information including IP addresses, phone numbers, codec(s), etc. The SIP INVITE can also include the request to establish a video and an audio channel (e.g., Video-SENDRECV; Audio-SENDRECV). At 504, UE C 106 can acknowledge receipt of the SIP INVITE by providing a 180 RINGING, or similar.

In this case, however, rather than accepting the video call, the user of UE C 106 instead chooses to downgrade the call to an audio call. This may be facilitated by new features provided on an incoming transfer GUI 800, discussed below in FIG. 8. Thus, UE C 106 can renegotiate the call in the subsequent response. At 506, therefore, UE C 106 can send a SIP 200 OK, but with updated parameters (Audio-SENDRECV; Video-DISABLED). This attempts to renegotiate the call from a video call to an audio call.

At 508, the CAS 108 can send a SIP UPDATE to UE A 102 with updated information to renegotiate an audio call between UE A 102 and UE C 106. Thus, the SIP UPDATE can include the new parameters (Audio-SENDRECV; Video-DISABLED), any new audio codec(s), and the IP address or phone number for UE C 106, among other things. At 510, UE A 102 can acknowledge the new information with a SIP 200 OK. Optionally, UE A 102 can repeat the parameters (Audio-SENDRECV; Video-DISABLED) and provide any updated information (e.g., a different audio codec) to the CAS 108 in the SIP 200 OK message.

At 512, the CAS 108 can relay the SIP 200 OK to UE C 106. In this case, the SIP 200 OK can also include the information for UE A 102 to be provided to UE C 106, including any updated information that may have been provided by UE A 102 to enable UE A 102 and UE C 106 to connect. At 514, an RTP session is now established between UE A 102 and UE C 106 for a voice over IP (VoIP) call. In this example, an audio call with bidirectional audio, but no video, is established.

As before, because the session between UE A 102 and UE C 106 has been established, the session between UE A 102 and the MRF 110 is no longer needed. In some examples, therefore, at 516, the CAS 108 can send a SIP INFO to the MRF 110 to cause the MRF to disconnect from UE A 102. In other examples, UE A 102 (instead of the CAS 108) can send a message to the MRF 110 to cause the session to terminate (e.g., a SIP BYE). In either case, at 518, the MRF 110 can send a response (e.g., a SIP BYE) to UE A 102 to terminate the session. At this point, the original call has been successfully transferred from the video call between UE A 102 and UE B 104 to an audio call between UE A 102 and UEC 106.

As mentioned above, unlike conventional methods, examples of the present disclosure can enable a transferor to transfer video calls as either audio or video calls. In addition, the transfer target can also choose to answer the call as an audio or a video call. Because these are new features, new methods and GUIs may be useful, as disclosed below with references to FIGS. 6-9C.

Figure 6:
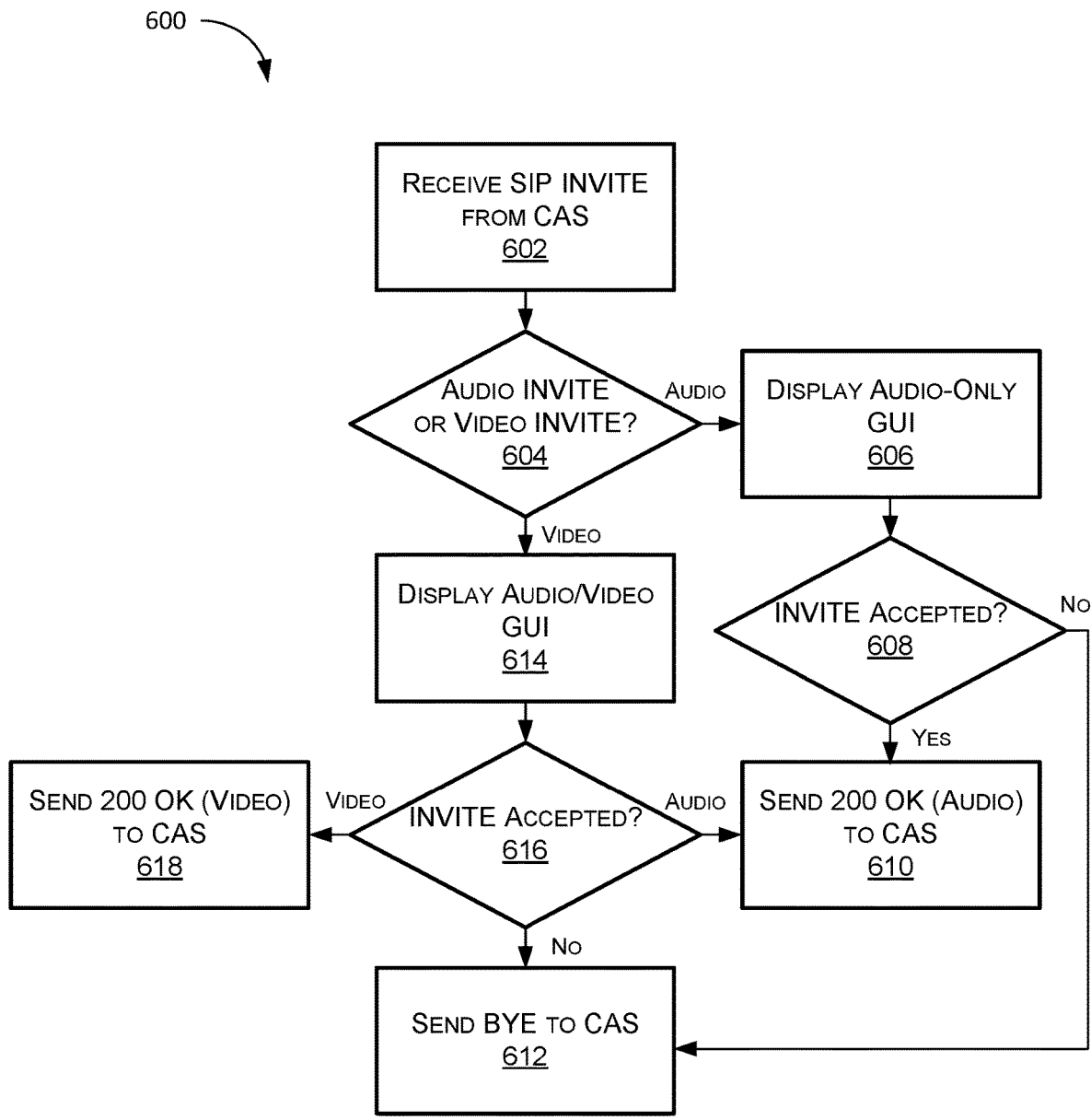
FIG. 6 is a flowchart depicting an example of a method for providing an audio graphical user interface (GUI) or a video GUI based on a selection by a user during an incoming transfer of a video call, in accordance with some examples of the present disclosure.

As shown in FIG. 6, examples of the present disclosure can comprise a method 600 for receiving audio and video call transfers. Again, this example assumes that UE A 102 and UE B 104 are initially on a video call and that UE B 104 has decided to transfer the call to UE C 106. As mentioned above, UE B 104 has the choice of transferring the call as an audio call or a video call, despite the fact that the call is initially a video call. The method 600 is discussed from the perspective of UE C 106.

At 602, UE C 106 can receive a SIP INVITE from the CAS 108. As mentioned in FIG. 4, the CAS 108 sends the SIP INVITE in response to the SIP REFER from UE B 104. At 604, to provide the user with any necessary choices for receiving the incoming call, UE C 106 can first determine whether the SIP INVITE is related to a video call (Audio-SENDRECV; Video SENDRECV) or an audio call (Audio-SENDRECV; Video INACTIVE). Obviously, a different GUI, or at least different inputs (e.g., buttons, drop-down menus, etc.) may be appropriate depending on whether the call is transferred as an audio call or a video call.

To this end, if the SIP INVITE is an audio SIP INVITE (Audio-SENDRECV; Video INACTIVE), at 606, UE C 106 can display an audio-only GUI. In other words, because the call has already been downgraded to an audio call by UE B 104 during the transfer, in this case, the full audio/video GUI (discussed below) is not needed. Indeed, all that is required in this case is an "accept incoming call" option (or similar) and a "decline incoming call" option. At 608, UE C 106 can determine if the call has been accepted or declined by the user—i.e., which of the above-mentioned buttons were selected. If the user selected the option associated with accepting the incoming call, then at 610, UE C 106 can send a SIP 200 OK to the CAS 108 indicating that the call has been accepted. The remainder of the process is substantially the same as described in steps 408-418 in FIG. 4.

If the call is declined by the user, on the other hand, then at 612, UE C 106 can send a SIP BYE (or similar) to the CAS 108 to decline the transfer. The CAS 108, in turn, can relay a SIP BYE to UE A 102 and both UEs 102, 106 are ultimately disconnected. In some examples, the call between the UA A 102 and the UE 104 is resumed rather than being disconnected at 612.

Referring back to step 604, if, on the other hand, the incoming SIP INVITE from the CAS 108 (and ultimately, from the REFER from UE B 104) is for a video call (Audio-SENDRECV; Video SENDRECV), on the other hand, then at 614, UE C 106 can display an audio/video GUI. The audio/video GUI can include additional options for accepting the video call. As a result, the audio/video GUI can include, for example, an "accept as video call" option, an "accept as audio call option," and a "decline call" option. An example GUI is discussed below with respect to FIG. 8; but, of course, other inputs, descriptions, icons, configurations, etc. could be used with similar effect.

At 616, UE C 106 can determine if the SIP INVITE was accepted and, if so, if the user accepted the call as a video call or is attempting to downgrade the call to an audio call. If the user chose to downgrade the call to an audio call, then at 610, UE C 106 can send a SIP 200 OK with parameters updated from the initial SIP INVITE (e.g., Audio-SEND-RECV; Video INACTIVE) to the CAS 108. As discussed above in FIG. 5, the CAS 108 can send an updated SIP INFO (or similar) to UE A 102 with the new parameters to provide the user of UE A 102 with an opportunity to accept or decline the video call. If the user declines the call altogether by selecting "decline call," or similar, then at 612, UE C 106 can send a SIP BYE to the CAS 108. As before, the CAS 108 can relay the SIP BYE to UE A 102 and the call is ultimately terminated.

If the user accepts the incoming video call, on the other hand, then at 618, UE C 106 can simply send a SIP 200 OK—indicating that the call has been accepted without modification to the parameters (Audio-SENDRECV; Video-SENDRECV). In some examples, the SIP 200 OK may nonetheless include some updated information such as, for example, a different audio or video codec. The CAS 108 can then relay the SIP 200 OK to UE A 102 and the video call transfer from UE B 104 to UE C 106 is complete. The use of multiple GUIs can provide users with the appropriate choices for the type of transfer and can also enable the user to choose the call type (audio or video) or decline the call as desired.

Figure 7:
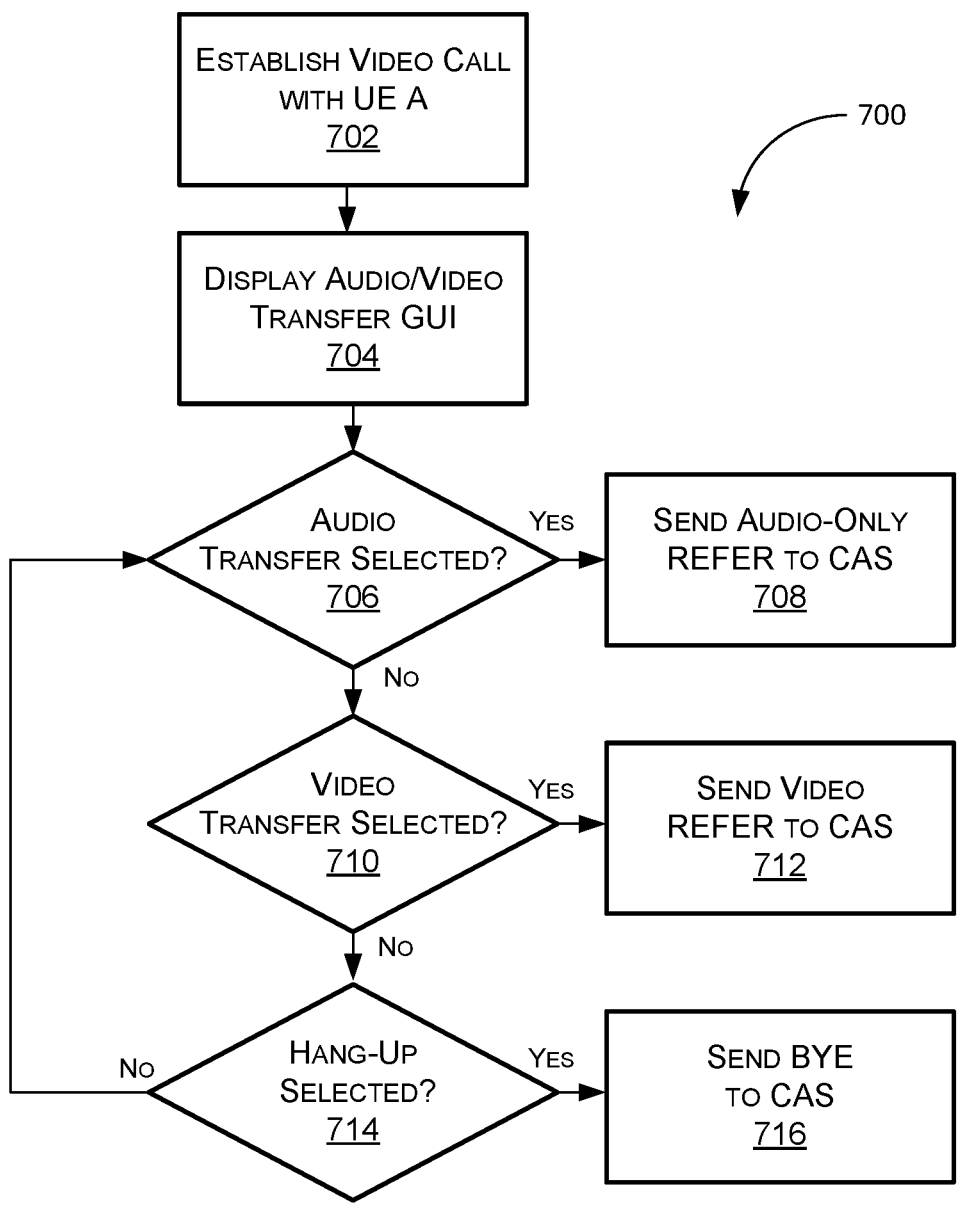
FIG. 7 is a flowchart depicting an example of a method for providing an audio transfer GUI or a video transfer GUI based on a selection by a user during an outgoing transfer of a video call, in accordance with some examples of the present disclosure.

Similarly, as shown in FIG. 7, examples of the present disclosure can also comprise a method 700 for accessing the above-mentioned video transfer functions. As before, the addition of new functions leads to the addition of new inputs to the GUI on the UE making the transfer (in this example UE B 104). As before, this example assumes that UE A 102 and UE B 104 are initially on a video call and that UE B 104 has decided to transfer the call to UE C 106. As mentioned above, UE B 104 has the choice of transferring the call as an audio call or a video call, despite the fact that the call is initially a video call. The method 700 is discussed from the perspective of UE B 104.

At 702, UE A 102 and UE B 104 can establish a video call. In this example, it is somewhat immaterial how the call was established (i.e., whether UE A 102 called UE B 104, or vice-versa). In one direction or the other, a SIP INVITE with the needed parameters (Audio-SENDRECV; Video-SEND-RECV) was sent from one of the UEs 102, 104 and accepted by the other of the UEs 102, 104 to establish an RTP session.

Figure 9A:
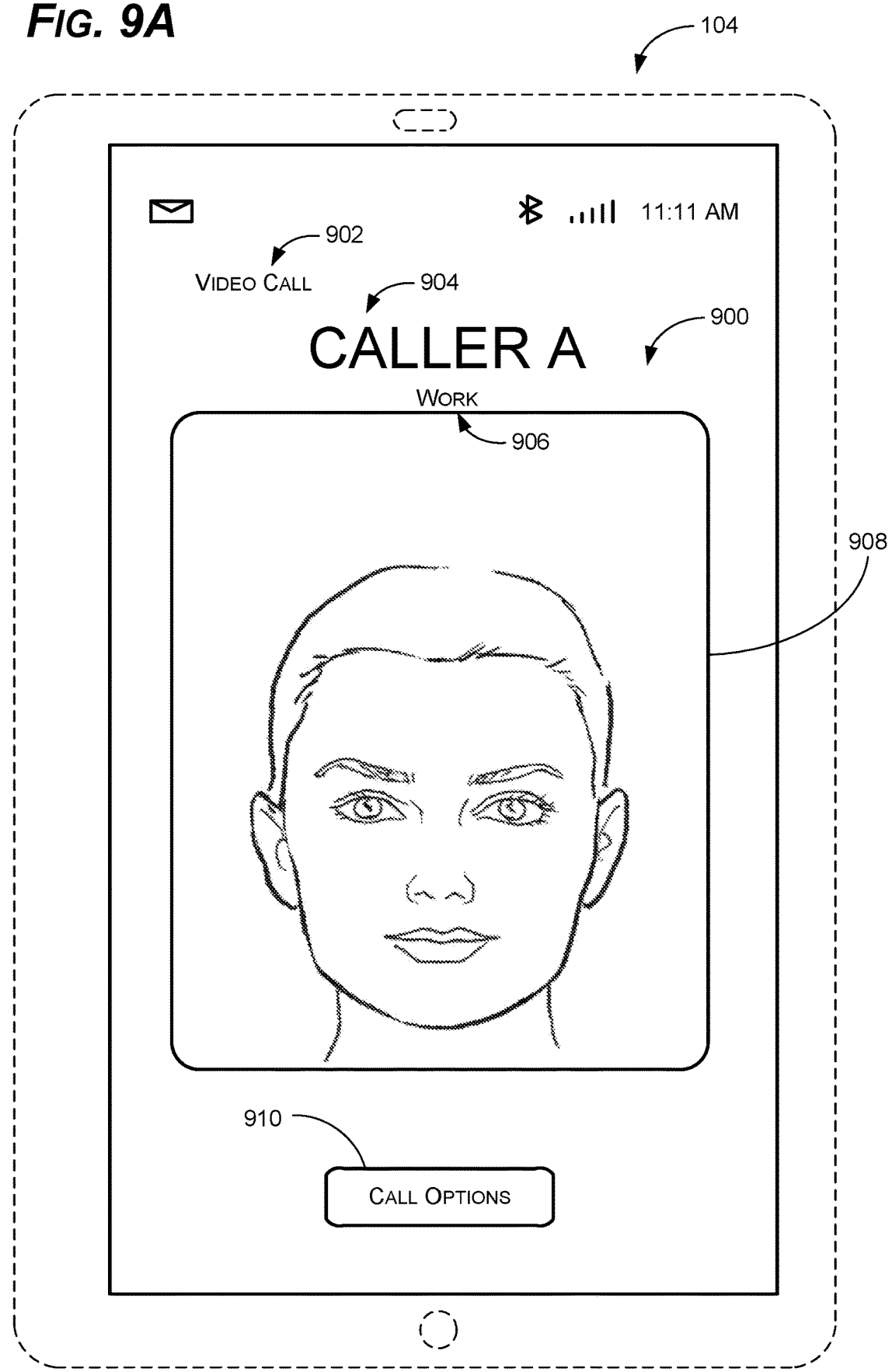
FIG. 9A is a depiction of an example video call GUI, in accordance with some examples of the present disclosure.
Figure 9B:
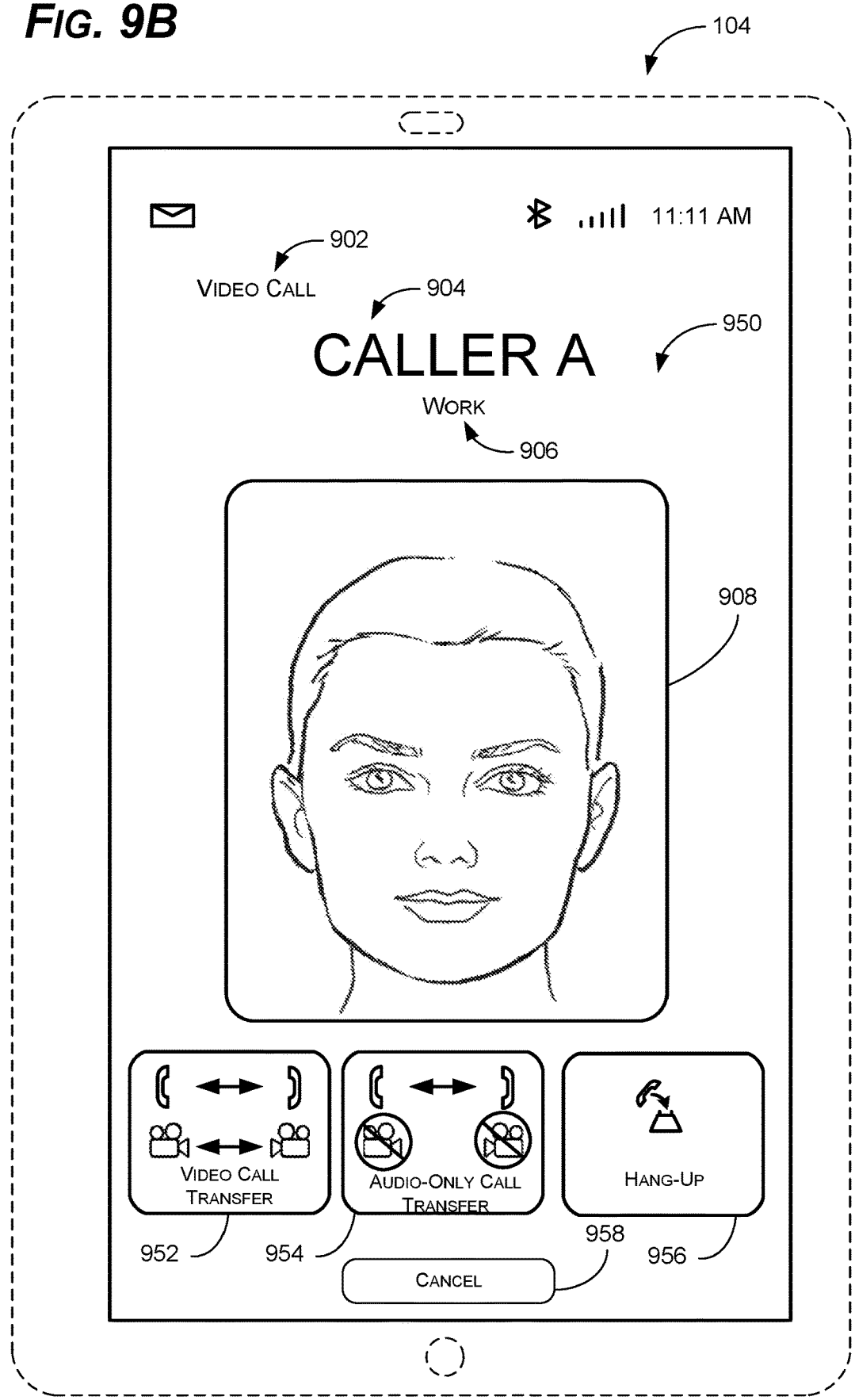
FIG. 9B is a depiction of an example call management GUI, in accordance with some examples of the present disclosure.
Figure 9C:
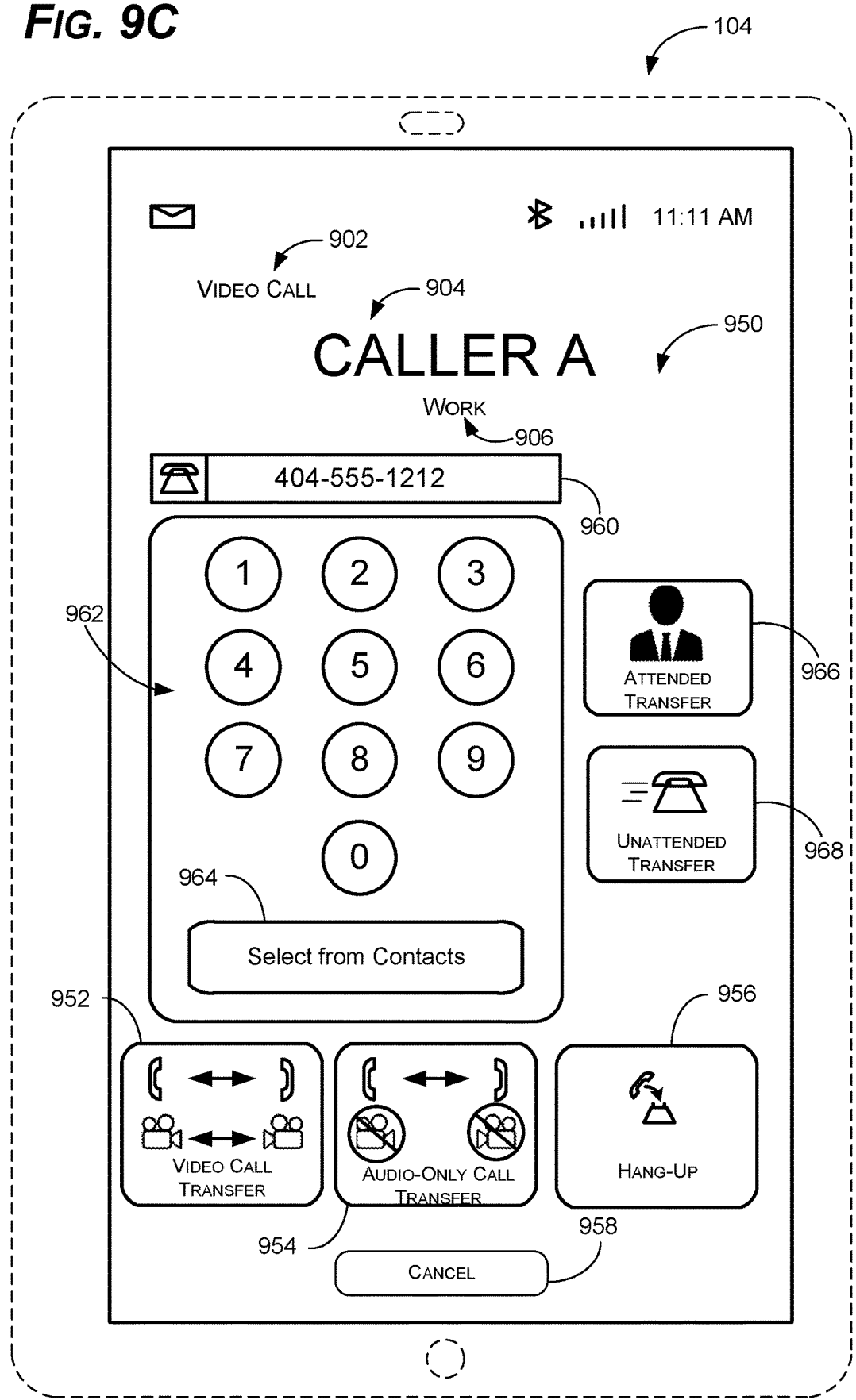
FIG. 9C is a depiction of the call management GUI of FIG. 9B with additional features selected, in accordance with some examples of the present disclosure.

At 704, during the video call, or in response to the selection of a "call options" button while on the call (FIG. 9A), for example, UE B 104 can display a call management GUI 950 (FIGS. 9B and 9C, discussed below). The call management GUI 950 can provide the user of UE B 104 with the options to (1) transfer the existing video call to UE C 106 as a video call, (2) transfer the existing video call to UE C 106, but as an audio call, or (3) hang-up.

At 706, given these options, UE B 104 can determine if the user has selected the audio transfer input. As mentioned above, this may be useful when a video conference has concluded and the user of UE B 104 wants to transfer UE A 102, but the video connection is not needed (e.g., scheduling a follow-up meeting with an administrative assistant). This may also be useful to conserve battery life on the UEs 102, 106 or to prevent excessive data usage, among other things. If the user selects to transfer the call as an audio call (i.e., to downgrade the video call to an audio call upon transfer), the UE B 104 can send an "audio-only" SIP REFER to the CAS 108 with the appropriate parameters (Audio-SENDRECV; Video-INACTIVE). As discussed above, if the REFER is accepted by the CAS 108, UE B 104 will ultimately be disconnected from the call with a SIP BYE from the CAS 108.

If the user does not select the audio transfer input, on the other hand, then at 710, UE B 104 can determine if the user selected the video transfer input. This can enable UE B 104 to transfer the video call with UE A 102 to UE C 106 (subject to approval by UE C 106). If the user selects the video transfer input, then at 712, UE B 104 can send a SIP REFER with the appropriate parameters (Audio-SENDRECV; Video-SENDRECV) to the CAS 108 to begin the transfer process discussed above.

If the user does not select either the audio transfer input or the video transfer input, then at 714, UE B 104 can determine if the user has selected the hang-up input to end the call. If the user has decided to hang up, then at 716, UE B 104 send a SIP BYE (or similar) to the CAS 108 and/or UE A 102 to end the call with UE A 102. In some examples, if no selection on the call management GUI 950 is made within a predetermined time of selecting the call options input 910 (e.g., 5 or 10 seconds), UE B 104 may simply return to the standard call GUI, an example of which is discussed below with respect to FIG. 9A.

Figure 8:
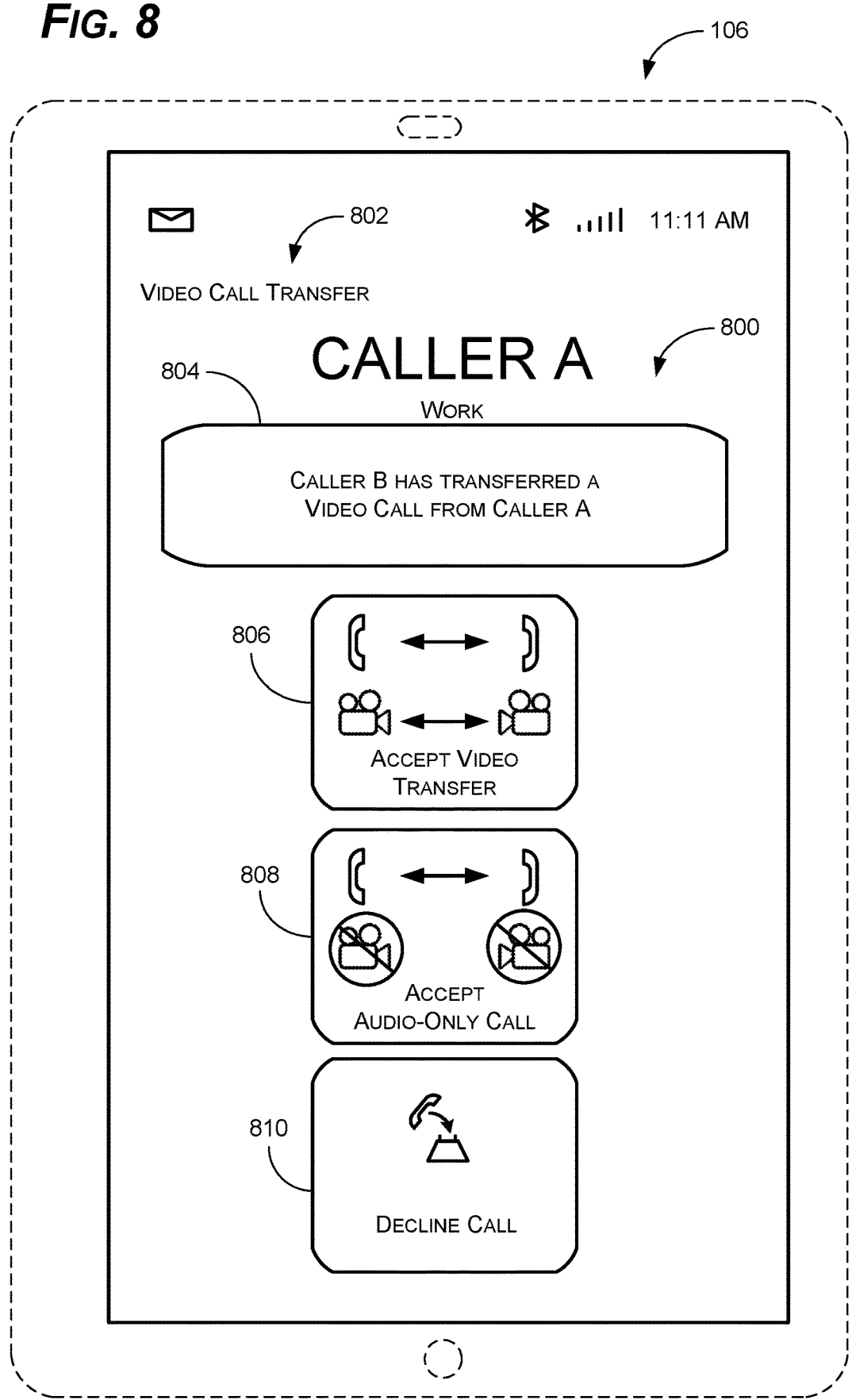
FIG. 8 is a depiction of an example incoming transfer GUI, in accordance with some examples of the present disclosure.

FIG. 8 is an example of an incoming transfer GUI 800 such as might be displayed on UE C 106 is response to receiving a SIP INVITE from the CAS 108. Based on the information provided in the SIP INVITE, the incoming transfer GUI 800 can display pertinent information and provide relevant inputs to enable the user to choose how, and whether, to accept the transfer of the video call. Unlike previous technologies, the incoming transfer GUI 800 can enable the user to accept the video call as-is, downgrade the call to an audio call, or decline the call.

In some examples, the incoming transfer GUI 800 can include a call status indicator 802. The call status indicator 802 can inform the user whether the call is an incoming audio call, incoming video call, or a transferred call, among other things. In the recurring example used herein, the incoming transfer GUI 800 is shown displayed on UE C 106 in response to a video call transfer of UE A 102 from UE B 104 to UE C 106. As a result, the call status indicator 802 can display, "Video Call Transfer," or similar. Of course, the call status indicator 802 could also include "Incoming Video Call," "Incoming Audio Call," "Audio Call Transfer," etc., as appropriate.

In some examples, based on the information provided in the SIP INVITE from the CAS 108, the incoming transfer GUI 800 can also include a call information window 804. Based on the REFER from UE B 104, for example, the call information window 804 can display information about the call including who is transferring the call (in this case, UE B 104), whether it is a video call or an audio call, and who is being transferred (in this case UE A 102). The call information window 804 may also include information about whether the transfer is attended or unattended, among other things.

Given the additional options provided by the systems and methods discussed herein, the incoming transfer GUI 800 can also include an accept video transfer input 806, an accept audio call input 808, and a decline call input 810. The inputs 806, 808, 810 can comprise virtual buttons on a touchscreen, physical buttons (e.g., the user can press 1, 2, or 3, respectively on a keypad), voice commands, or any other kind of gesture or input to enable the user to make the appropriate selection.

As the name implies, the accept video transfer input 806 enables the user to accept the incoming video call transfer. Thus, selecting the accept video transfer input 806 can cause UE C 106 to send a SIP 200 OK to the CAS 108 to acknowledge the video call transfer. In some examples, a simple SIP 200 OK is all that is required—e.g., if no modifications are being made. In other examples, the SIP 200 OK can confirm the parameters (Audio-SENDRECV; Video-SENDRECV), update a codec, or provide other information to facilitate the transfer.

Selecting the accept audio call input 808, on the other hand, can cause UE C 106 to send updated parameters (Audio-SENDRECV; Video-DISABLED) in a SIP 200 OK or an SIP INVITE to the CAS 108. This can cause the video call to drop to an audio call, subject to acceptance by UE A 102. The response may also include other updates information (e.g., routing information, codec(s), etc.).

Finally, the decline call input 810 can enable the user to decline the call altogether. Selecting the decline call input 810 can cause UE C 106 to send a SIP BYE (or similar) to the CAS 108 to terminate the call. The CAS 108, in turn, can send a SIP BYE to UE A 102. In some examples, UE A 102 may receive a recorded message, for example, from the CAS 108 indicating that the call has been declined. In other examples, UE A 102 may play a fast busy, or some other tone, upon receiving the SIP BYE to indicate the call failure.

As shown in FIGS. 9A-9C, examples of the present disclosure can also comprise a video call GUI 900 (FIG. 9A) and a call management GUI 950 (FIGS. 9B and 9C). The GUIs 900, 950 can provide complementary functions to enable the enhanced video call transfer functions discussed herein. In this example, because UE B 104 is transferring the call, the GUIs 900, 950 are shown displayed on the screen of UE B 104.

The video call GUI 900 can include, for example, a call type indicator 902. The call type indicator 902 can provide information about the type of call the user of UE B 104 is currently participating in. Thus, the call type indicator 902 may include options such as "Video Call" and "Audio Call." The call type indicator 902 may also include more specific information such as, for example, "VoIP Call" or "Cellular Call." In this case, the call type indicator 902 indicates that UE B 104 is on a video call.

The video call GUI 900 can also include caller ID information such as, for example, the caller's name 904 and the contact type 906. Obviously, the caller name 904 can be a person's name, the name of a business, a title (e.g., Uncle Ed), or any other relevant information. The contact type 906 can indicate what number is being used for the call—e.g., work, cell, home, etc. The video call GUI 900 can also include a video window 908 to display the user on the video call; in this case, the user associated with UE A 102.

Importantly, the video call GUI 900 can also include a call options input 910. The call options input 910 can comprise virtual buttons on a touchscreen, physical buttons (e.g., the user can press a number or letter on a keyboard or keypad), voice commands, or any other kind of input to enable the user to make the appropriate selection. Selecting the call options input 910 can invoke the call management GUI 950, as shown in FIGS. 9B and 9C.

As shown in FIG. 9B, the call management GUI 950 can include some of the same features as the video call GUI 900 (e.g., the call type indicator 902, caller name 904, and the contact type 906, etc.), but can also include multiple inputs to enable the user to transfer or end the video call. To this end, selecting the call options input 910 on the video call GUI 900 can cause UE B 104 to display the call management GUI 950, including a video call transfer input 952, an audio call transfer input 954, and a hang-up input 956.

As the name implies, selecting the video call transfer input 952 causes UE B 104 to initiate the transfer of the current video call as a video call. Thus, in response to the selection of the video call transfer input 952, UE B 104 can send a SIP REFER to the CAS 108 to transfer the video call to UE C 106. Similarly, selecting the audio call transfer input 954 causes UE B 104 to transfer the current video call, but to downgrade it to an audio call at the same time. Selecting the hang-up input 956 obviously causes UE B 104 to terminate the current video call. In some examples, the call management GUI 950 can also include a cancel input 958, which causes UE B 104 to revert back to the video call GUI 900. This may be useful when the user changes their mind, for example, or when, after discussing a transfer with the transferee, the transferee would prefer to simply place a separate call.

As shown in FIG. 9C, to enable the user to select the transfer target—in this case UE C 106—selecting either the video call transfer input 952 or the audio call transfer input 954 can also cause a number of additional features to appear on the call management GUI 950. These features can include, for example, a contact box 960, a keypad 962 that can be used as a dialer to manually input a phone number, and a contact input 964. These features can be displayed instead of the video window 908, as shown, overlying the video window 908, or above or below the video window 908, as desired. The contact box 960 can display the number being dialed, such as when the user dials the number directly on the keypad 962. The contact box 960 can also display contact names, numbers, and other information when the user dials a number that is associated with an existing contact, for example, or when the user chooses a contact directly from the contacts stored on UE B 104.

The call management GUI 950 can also include the keypad 962. The keypad 962 can enable the user to simply enter the number of the transfer target directly on the keypad 962. The contact input 964, on the other hand, can enable the user to select an existing contact from the contacts associated with UE B 104, which may be stored locally or on a remote server or cloud server.

After selecting the desired transfer target, the user can select either the attended transfer input 966 or the unattended transfer input 968. As mentioned above, the attended transfer input 966 can enable the user to initially be connected to the transfer target (e.g., UE B 104 can be connected to UE C 106) to announce the forthcoming transfer. After the user has announced the transfer, the user can select the attended transfer input 966 again (or provide some other input) to complete the transfer. Selecting the unattended transfer input 968, on the other hand, simply sends the transfer immediately to the CAS 108, as described above. In this case, the transfer is started and UE B 104 is disconnected from the call regardless of whether the transfer is accepted, downgraded, etc.

Figure 10:
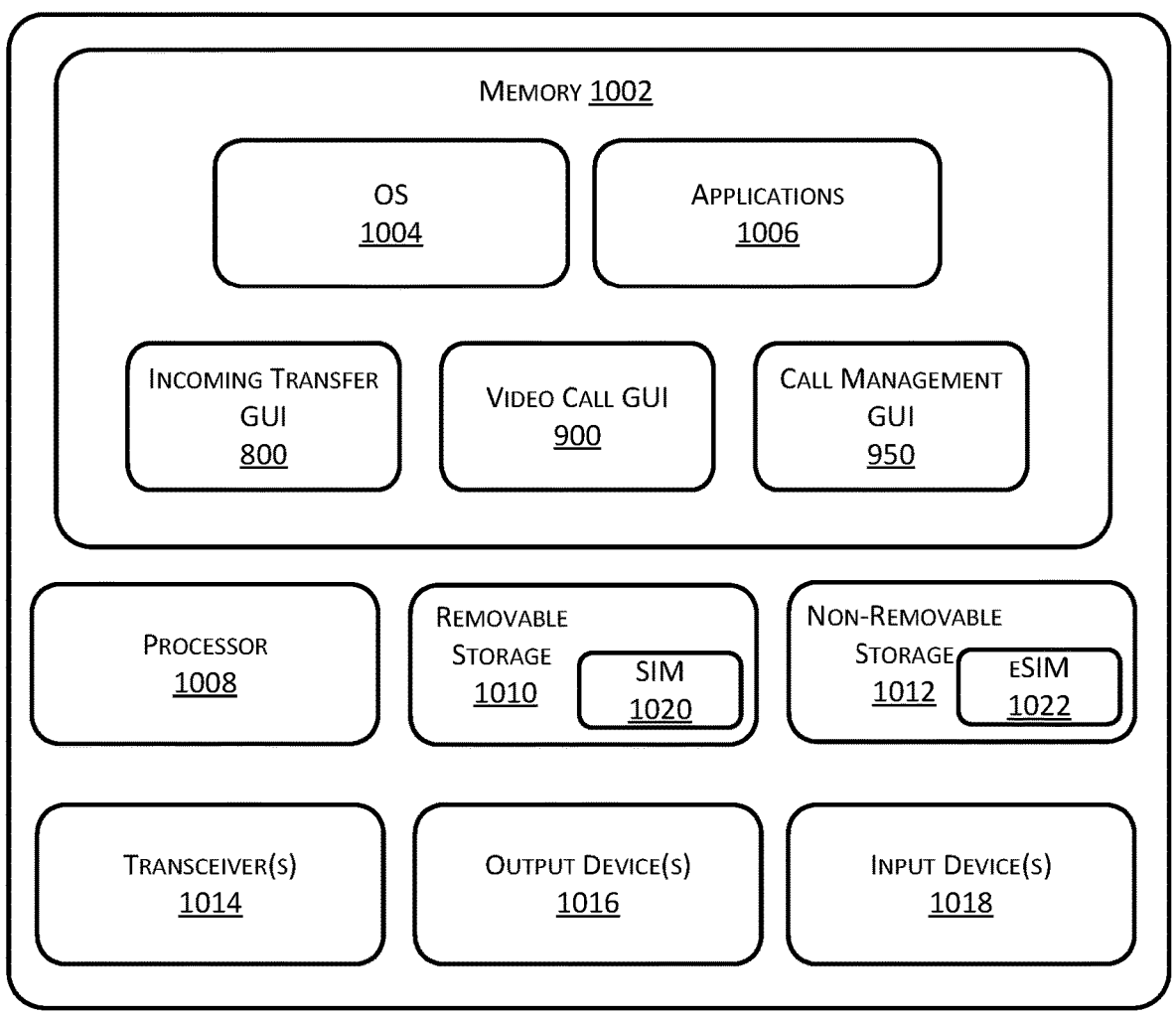
FIG. 10 is an example of a UE for use with the systems and methods disclosed herein, in accordance with some examples of the present disclosure.

FIG. 10 depicts a component level view of a UE 1000 (e.g., UE A 102, UE B 104, or UE C 106) for use with the systems and methods described herein. The UE 1000 could be any UE capable of making audio and/or video calls on the cellular network, the IMS 1200, and/or IP networks 1212 (discussed below). For clarity, the UE 1000 is described herein generally as a cell phone, smart phone, or laptop computer. One of skill in the art will recognize, however, that the systems and methods described herein can also be used with a variety of other electronic devices, such as, for example, tablet computers, desktops, and other network (e.g., cellular or IP network) connected devices. Indeed, the UE 1000 can be any device that can send and receive video and/or audio calls that can benefit from improved call management.

The UE 1000 can comprise several components to execute the above-mentioned functions. As discussed below, the UE 1000 can comprise memory 1002 including an operating system (OS) 1004 and one or more standard applications 1006. The standard applications 1006 can include many features common to UE 1000 such as, for example, calendars, call logs, voicemail, etc. In this case, the standard applications 1006 can also comprise a video call application (e.g., Facetime) and a standard audio call application to enable users to engage in audio and video calls, as described above. The standard applications 1006 can also include contacts to enable the user to select a contact to initiate a video call and/or to select a transfer target.

The UE 1000 can also comprise the GUIs 800, 900, 950. The GUIs 800, 900, 950 can be used in conjunction with the onboard video and audio call application(s) on the UE 1000 to enable the UE 1000 to provide the upgraded call transfer and receipt functions. The GUIs 800, 900, 950 can be used in conjunction with the one or more input device(s) 1018 and output device(s) 1016, discussed below.

The UE 1000 can also comprise one or more processors 1008 and one or more of removable storage 1010, non-removable storage 1012, transceiver(s) 1014, output device (s) 1016, and input device(s) 1018. In some examples, such as for cellular communication devices, the UE 1000 can also include a subscriber identity module (SIM) 1020 and/or an embedded SIM (eSIM) 1022, which can include a mobile country code (MCC), mobile network code (MNC), international mobile subscriber identity (IMSI), and other relevant information. In some examples, one or more of the functions (e.g., standard applications 1006 and/or the GUIs 800, 900, 950) can be stored on the SIM 1020 or the eSIM 1022 in addition to, or instead of, being stored in the memory 1002.

In various implementations, the memory 1002 can be volatile (such as random access memory (RAM)), non-volatile (such as read only memory (ROM), flash memory, etc.), or some combination of the two. The memory 1002 can include all, or part, of the functions 1006, GUIs 800, 900, 950, and the OS 1004 for the UE 1000, among other things. In some examples, rather than being stored in the memory 1002, some, or all, of the functions 1006, GUIs 800, 900, 950, OS 1004, and other information (e.g., call history, contacts, etc.) can be stored on a remote server or a cloud of servers accessible by the UE 1000 such as the CAS 108 or a TAS 1228 (discussed below).

The memory 1002 can also include the OS 1004. Of course, the OS 1004 varies depending on the manufacturer of the UE 1000 and currently comprises, for example, iOS 11.4.1 for Apple products and Pie for Android products. The OS 1004 contains the modules and software that support a UE's basic functions, such as scheduling tasks, executing applications, and controlling peripherals. In some examples, the OS 1004 can enable the video call application to conduct video calls and call transfers, as described above, via the transceiver(s) 1014. The OS 1004 can send information to the GUIs 800, 900, 950, for example, to cause the GUIs 800, 900, 950 to display contact information, phone numbers, and other call data. The OS 1004 can also receive inputs from the GUIs 800, 900, 950 to cause the transceiver to send data, for example, or to change a display on the UE 1000, among other things. The OS 1004 can also enable the UE 1000 to send and retrieve other data via a cellular data connection or internet connection and perform other functions.

The UE 1000 can also comprise one or more processors 1008. In some implementations, the processor(s) 1008 can be a central processing unit (CPU), a graphics processing unit (GPU), both CPU and GPU, or any other processing unit. The UE 1000 may also include additional data storage devices (removable and/or non-removable) such as, for example, magnetic disks, optical disks, or tape. Such additional storage is illustrated in FIG. 10 by removable storage 1010 and non-removable storage 1012. The removable storage 1010 and non-removable storage 1012 can store some, or all, of the functions 1006, GUIs 800, 900, 950, and/or the OS 1004.

Non-transitory computer-readable media may include volatile and nonvolatile, removable and non-removable tangible, physical media implemented in technology for storage of information, such as computer readable instructions, data structures, program modules, or other data. The memory 1002, removable storage 1010, and non-removable storage 1012 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the UE 1000. Any such non-transitory computer-readable media may be part of the UE 1000 or may be a separate database, databank, remote server, or cloud-based server.

In some implementations, the transceiver(s) 1014 include any transceivers known in the art. In some examples, the transceiver(s) 1014 can include wireless modem(s) to facilitate wireless connectivity (e.g. wireless transmissions) with other components (e.g., between the UEs 102, 104, 106), the Internet, and/or an intranet via the cellular and IP networks. Specifically, the transceiver(s) 1014 can include one or more transceivers 1014 that can enable the UE 1000 to connect to, and transfer, both video and/or audio calls. Thus, the transceiver(s) 1014 can include multiple single-channel transceivers 1014 or a multi-frequency, multi-channel transceiver 1014 to enable the UE 1000 to send and receive a bidirectional video stream and a bidirectional audio stream, among other things. The transceiver(s) 1014 can enable the UE 1000 to connect to multiple networks including, but not limited to the 2G 1202, 3G 1204, 4G 1206, and 5G 1208 networks. The transceiver(s) 1014 can also include one or more transceivers 1014 to enable the UE 1000 to connect to future (e.g., 6G) networks, Internet-of-Things (IoT), machine-to machine (M2M), and other current and future networks.

The transceiver(s) 1014 may also include one or more radio transceivers that perform the function of transmitting and receiving radio frequency communications via an antenna (e.g., Wi-Fi 1210 or Bluetooth®). In other examples, the transceiver(s) 1014 may include wired communication components, such as a wired modem or Ethernet port, for communicating via one or more wired networks. The transceiver(s) 1014 can enable the UE 1000 to make audio and video calls, download files, access web applications, and provide other communications associated with the systems and methods, described above.

In some implementations, the output device(s) 1016 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen, or display, on which the GUIs 800, 900, 950 can be displayed. The output device(s) 1016 can also include speakers, or similar devices, to play sounds or ringtone when an audio call, video call, or transferred call is being received. The output device(s) 1016 can also provide tones or sounds when a video transfer is complete, for example, or when other tasks associated with the systems and methods described herein are initiated or completed. Output device(s) 1016 can also include ports for one or more peripheral devices, such as headphones, peripheral speakers, or a peripheral display.

In various implementations, input device(s) 1018 include any input devices known in the art. For example, the input device(s) 1018 may include a camera, a microphone, or a keyboard/keypad. The input device(s) 1018 can include a touch-sensitive display or a keyboard to enable users to enter data and make requests and receive responses via web applications (e.g., in a web browser), make audio and video calls, and use the standard applications 1006, among other things. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like.

The touch sensitive display can be used to display the GUIs 800, 900, 950 and to act as both an input device 1018 and an output device 1016. The touch sensitive display can display the keypad 962, for example, to enable the user to enter the number of a transfer target on the call management GUI 950. Thus, the touch sensitive display can display the GUIs 800, 900, 950, including relevant call information and receive selections from the user (e.g., to initiate a transfer, answer a call, etc.), among other things.

Figure 11:
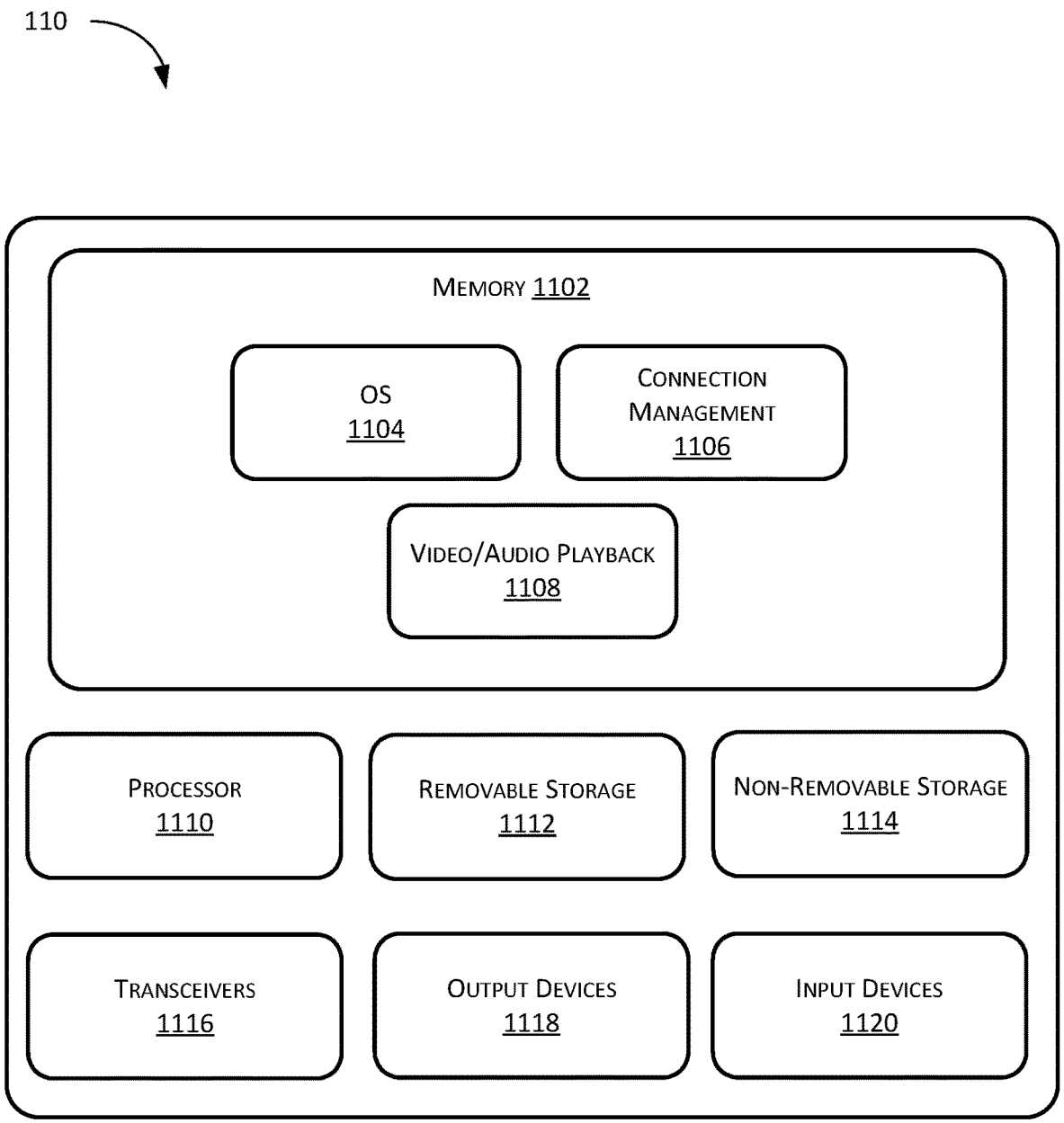
FIG. 11 is an example of an MRF for use with the systems and methods disclosed herein, in accordance with some examples of the present disclosure.

As shown in FIG. 11, the systems and methods discussed herein can also be used in conjunction with the MRF 110. To simplify the discussion, the MRF 110 is discussed below as a standalone server. One of skill in the art will recognize, however, that the systems and methods disclosed herein can also be implemented partially, or fully, on a network entity such as, for example, the HLR/HSS 1216, a third-generation partnership project authentication, authorization, and accounting (3GPP AAA), or on another existing network entity. Thus, the discussion below in terms of the MRF 110 is not intended to limit the disclosure to the use of a standalone server. The MRF 110 can be a TAS 1228, for example, capable of connecting with multiple UEs (e.g., UEs 102, 104, 106), providing video and/or audio playback, and performing other functions, as discussed above.

The MRF 110 can comprise a number of components to execute part, or all, of the above-mentioned systems and methods. The MRF 110 can comprise memory 1102 including, for example, an OS 1104, connection management 1106, and audio/video playback 1108. In various implementations, the memory 1102 can be volatile (such as RAM), non-volatile (such as ROM, flash memory, etc.), or some combination of the two. The memory 1102 can include all, or part, of the functions 1106, 1108 and the OS 1104 for the MRF 110, among other things.

The OS 1104 can vary depending on the manufacturer of the MRF 110 and the type of component. Many servers, for example, run Linux or Windows server. Dedicated cellular routing servers may run specific telecommunications OSs. The OS 1104 contains the modules and software that supports a computer's basic functions, such as scheduling tasks, executing applications, and controlling peripherals. The OS 1104 can enable the MRF 110 to send and receive SIP messages, connect with UEs, provide audio and/or video playback, etc. Thus, the OS 1104 can also enable the MRF 110 to perform some, or all, of the functions associated with the systems and methods discussed herein.

In some examples, the memory 1102 can also include connection management 1106. Connection management 1106 can enable the MRF 110 to connect to multiple UEs at the same time to provide the aforementioned "video hold" features. Thus, the MRF 110 can connect to UEs awaiting a transfer (e.g., UE A 102), provide a video and/or audio feed to maintain the video call, and then disconnect from the UE when the transfer is completed (or declined). Connection management 1106 can work in concert with the OS 1104 and the transceiver(s) 1116, for example, to manage cellular connections between hundreds or thousands of UEs at the same time to enable one MRF 110 to serve one or more wireless base stations (WBSs), a particular area, county, city, state, region, etc.

The MRF 110 can also include audio/video playback 1108. As the name implies, audio/video playback 1108 can enable the MRF 110 to provide an audio and/or video stream to UEs that are on video hold. As mentioned above, regardless of whether a transfer is made or accepted as a video call or an audio call, the MRF 110 can provide a video and audio stream to the UE (e.g., UE A 102) to maintain the video call and prevent the call from dropping to an audio call by automatic operation. The MRF 110 may provide a prerecorded video and/or audio stream—so called, "hold music"—or may provide live TV, live radio with a black screen, or simply a black screen.

The MRF 110 can also comprise one or more processors 1110. In some implementations, the processor(s) 1110 can be a central processing unit (CPU), a graphics processing unit (GPU), both CPU and GPU, or any other processing unit. The MRF 110 can also include one or more of removable storage 1112, non-removable storage 1114, transceiver(s) 1116, output device(s) 1118, and input device(s) 1120.

The MRF 110 may also include additional data storage devices (removable and/or non-removable) such as, for example, magnetic disks, optical disks, or tape. Such additional storage is illustrated in FIG. 11 by removable storage 1112 and non-removable storage 1114. The removable storage 1112 and non-removable storage 1114 can store some, or all, of the OS 1104 and other functions 1106, 1108.

Non-transitory computer-readable media may include volatile and nonvolatile, removable and non-removable tangible, physical media implemented in technology for storage of information, such as computer-readable instructions, data structures, program modules, or other data. The memory 1102, removable storage 1112, and non-removable storage 1114 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the MRF 110. Any such non-transitory computer-readable media may be part of the MRF 110 or may be a separate database, databank, remote server, or cloud-based server.

In some implementations, the transceiver(s) 1116 include any transceivers known in the art. In some examples, the transceiver(s) 1116 can include wireless modem(s) to facilitate wireless connectivity with multiple UEs (e.g., UEs 102, 104, 106), the Internet, the cellular network, and/or an intranet via a cellular connection. The transceiver(s) 1116 may enable the MRF 110 to connect with the UEs on multiple networks (e.g., the 2G 1202 3G 1204, 4G 1206, and 5G 1208 networks). The transceiver(s) 1116 can comprise multiple single frequency transceivers or one or more multi-frequency/multi-channel transceivers to enable the MRF 110 to communicate with tens, hundreds, or even thousands of UEs simultaneously.

The transceiver(s) 1116 may include a radio transceiver that performs the function of transmitting and receiving radio frequency communications via an antenna (e.g., Wi-Fi 1210 or Bluetooth®) to connect to the IP network 1212 or another network. In other examples, the transceiver(s) 1116 may include wired communication components, such as a wired modem or Ethernet port.

In some implementations, the output device(s) 1118 include any output devices known in the art, such as a display (e.g., a liquid crystal or thin-film transistor (TFT) display), a touchscreen display, speakers, a vibrating mechanism, or a tactile feedback mechanism. In some examples, the output device(s) 1118 can play various sounds based on, for example, when a UE 1000 is connected or disconnected, when a video or audio stream starts or stops, when a transfer is declined, etc. Output device(s) 1118 can also include ports for one or more peripheral devices, such as headphones, peripheral speakers, or a peripheral display.

In various implementations, input device(s) 1120 include any input devices known in the art. For example, the input device(s) 1120 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 12:
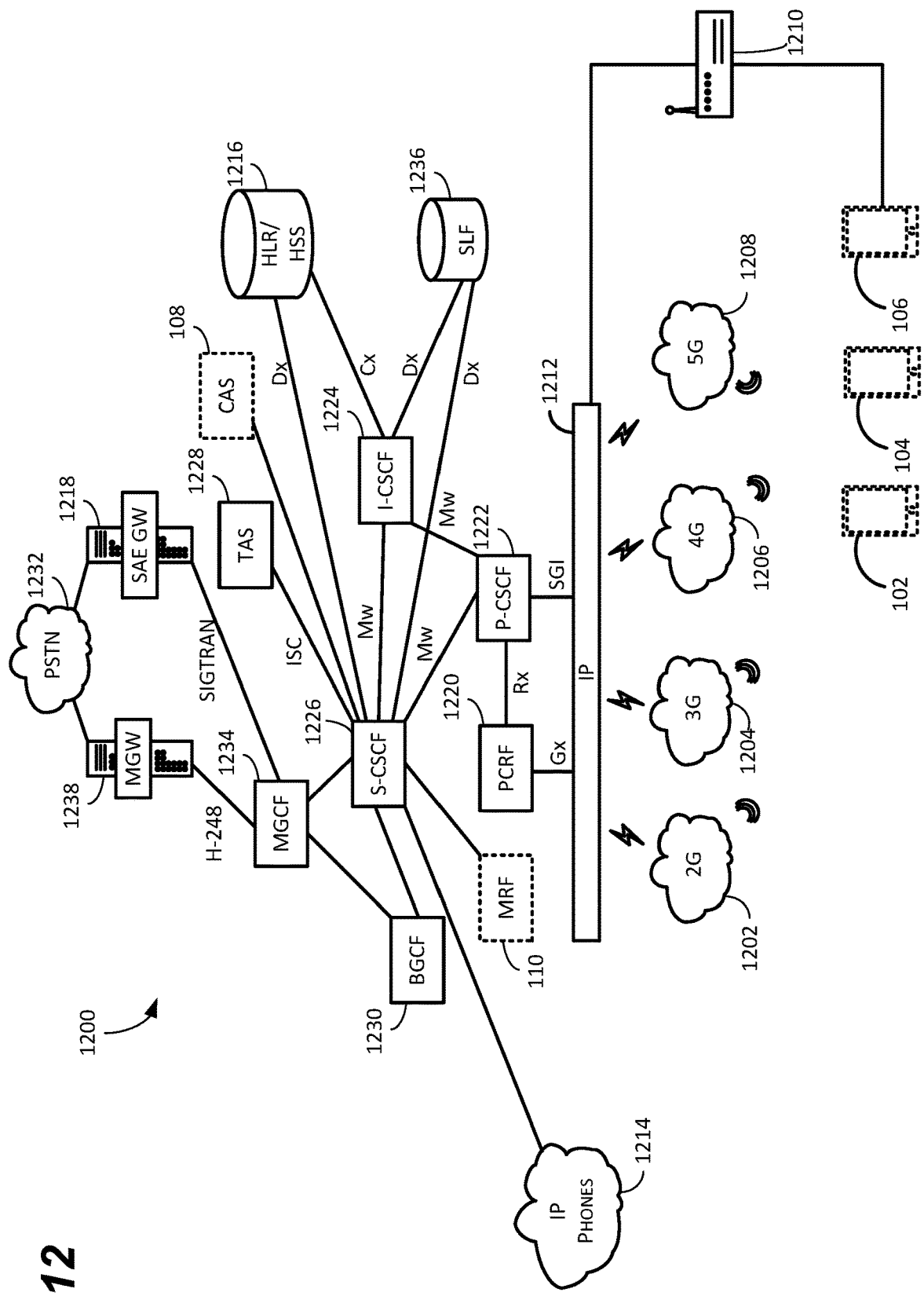
FIG. 12 is the example system of FIG. 1 shown in the context of an internet multimedia subsystem (IMS), in accordance with some examples of the present disclosure.

FIG. 12 is an example of the system 100 (highlighted by dashed lines) in the context of an internet multimedia subsystem (IMS) 1200. As shown, the IMS 1200 includes the system 100 and several network components for routing signals, storing subscriber information, and connecting across various subsystems and network types. The IMS 1200 is built on SIP and is the base to further support packaging of voice, video, data, and fixed and mobile services on a single platform to end users. It enables communications across multiple types of networks, including cellular, satellite, broadband, cable, and fixed networks, and enables the creation of efficient interoperating networks.

As shown, the IMS 1200 also provides interoperability for the UEs 102, 104, 106 and other devices across multiple networks including, for example, 2G 1202, 3G 1204, 4G 1206, 5G 1208, Wi-Fi 1210, and internet protocol (IP) 1212 networks. Thus, the IMS 1200 provides the interoperability to enable the UEs 102, 104, 106 to connect to multiple networks (e.g., the 4G 1206 and 5G 1208 networks) separately or simultaneously. The UEs 102, 104, 106 can connect to the 4G 1206 network for some services (e.g., voice and/or video calls), for example, and the 5G 1208 network for other services (e.g., large downloads).

The IMS 1200 also includes a variety of network entities for providing different services, which can include the CAS 108 and the MRF 110, discussed herein. And, while the CAS 108 and MRF 110 are shown in FIG. 12 as separate entities, these components 108, 110 could be included as part of one of the existing IMS 1200 entities (e.g., the serving call session control function, or S-CSCF 1226, discussed below).

As mentioned above, the CAS 108 can be an application server configured to provide video and audio calls. As shown in FIG. 12, the CAS 108 can be in communication with the S-CSCF 1226 and can provide routing information, SIP signaling, and other functionality. The CAS 108 is a specific implementation of a telephony application server (TAS) 1228, which are discussed below in greater detail.

The MRF 110, in conjunction with the S-CSCF 1226 and the CAS 108, is responsible for carrying out a variety of tasks for media streams associated with various services. This can include, for example, voice and video conferencing, playing of announcements to users including, in this case, audio and/or video streams to maintain a video connection. But the MRF 110 can also provide session failure notifications, announcements related to pending transfers, and other functions.

In some examples, the MRF 110 can include a multimedia resource function controller (MRFC) and a multimedia resource function processor (MRFP)—not shown separately. The MRFC can provide the control aspect of the MRF 110 and can process SIP requests received from the S-CSCF 1226, the CAS 108, and other TASs 1228. Based on the type of request, the MRFC can also utilize the MRFP, as appropriate. The MRFP includes the media plane processing of the MRF 110. The MRFP provides a variety of services including, for example, conferencing, playing of announcements, audio transcoding, recording, media analysis, etc. The functionality of the MRFP is sometimes integrated into what is often referred to as a "media server."

In some examples, the IMS 1200 can also include, for example, a home location register/home subscriber service (HLR/HSS) 1216, a service architecture evolution gateway (SAE GW) 1218, and a policy and charging rules function (PCRF) 1220, among other things. The HLR/HSS 1216 is a central database that contains user-related and subscription-related information. The functions of the HLR/HSS 1216 include mobility management, call and session establishment support, user authentication and access authorization. The HSS, which is used for 4G and 5G connections, is based on the previous HLR and authentication center (AuC) from code division multiple access (CDMA) and global system for mobile communications (GSM) technologies, with each serving substantially the same functions for their respective networks.

The HLR/HSS 1216 can also serve to provide routing instructions (e.g., IP addresses or phone numbers for various requests), and provide any billing associated with these requests (e.g., to access one network or the other). So, for example, UE A 102 can send a request to place a video call to UE B 104 to a proxy call session control function (P-CSCF) 1222, discussed below. The P-CSCF 1222, in turn, can then provide information to the HLR/HSS 1216 with the necessary credentials to enable UE A 102 to access the 4G 1206 and/or 5G 1208 networks, for example, via the IMS 1200. Once authenticated, the HLR/HSS 1216 can then ensure the user is authorized to use the services included in the requests (e.g., to make a video call or download a file), for example, or send an authorization request to a 3GPP AAA server, among other things.

The SAE GW 1218 routes and forwards user data packets, while also acting as the mobility anchor for the user plane during inter-eNodeB handovers and as the anchor for mobility between 4G 1206, 5G 1208, and other 3GPP technologies. The SAE GW 1218 is also responsible, for example, for terminating the S4 interface and relaying traffic between 2G 1202/3G 1204 systems and the packet data network gateway (PGW). When the UEs 102, 104, 106 are in idle state, the SAE GW 1218 terminates the downlink data path and triggers paging when downlink data arrives for the UEs 102, 104, 106. The SAE GW 1218 also manages and stores UE contexts such as, for example, parameters of the IP bearer service and network internal routing information.

The PCRF 1220 is a software node that determines policy rules in the overall cellular network, and in the IMS 1200 specifically. The PCRF 1220 generally operates at the network core and accesses subscriber databases (e.g., via the HLR/HSS 1216) and other specialized functions, such as content handling, such as whether the user has sufficient data left in their plan to receive a video call, in a centralized manner. The PCRF 1220 is the main part of the IMS 1200 that aggregates information between the IMS 1200 and other sources. The PCRF 1220 can support the creation of rules and then can automatically make policy decisions for each subscriber active on the IMS 1200. The PCRF 1220 can also be integrated with different platforms like rating, charging, and subscriber databases or can be deployed as a standalone entity.

The IMS 1200 also includes the P-CSCF 1222. The P-CSCF 1222 is the entry point to the IMS 1200 and serves as the outbound proxy server for UEs. The UEs attach to the P-CSCF 1222 prior to performing IMS registrations and initiating SIP sessions. The P-CSCF 1222 may be in the home domain of the IMS operator, or it may be in the visiting domain, where one or more UEs are currently roaming. For attachment to a given P-CSCF 1222, the UEs perform P-CSCF 1222 discovery procedures. Attachment to the P-CSCF 1222 enables the UEs to initiate registrations and sessions with the IMS 1200.

The IMS 1200 also includes an interrogating-call session control function (I-CSCF) 1224. The I-CSCF 1224 acts as an inbound SIP proxy server in the IMS 1200. During IMS registrations, the I-CSCF 1224 queries the HLR/HSS 1216 to select the appropriate S-CSCF 1226, discussed below, which can serve a UE. During IMS sessions, the I-CSCF 1224 acts as the entry point to terminating session requests. The I-CSCF 1224 routes the incoming session requests to the S-CSCF 1226 of the called party.

The S-CSCF 1226 acts as a registrar server, and in some cases, as a redirect server. The S-CSCF 1226 facilitates the routing path for mobile-originated or mobile-terminated session requests. The S-CSCF 1226 also interacts with various components for playing tones and announcements, among other things. For the systems and methods discussed herein, the S-CSCF 1226 can receive requests from the UEs 102, 104, 106 (e.g., to place or transfer a video call), for example, and establish the appropriate sessions with third-party application servers, the CAS 108, TASs 1228, and other entities according to the services requested by the UEs 102, 104, 106.

The IMS 1200 also includes a breakout gateway control function (BGCF) 1230. The BGCF 1230 is the IMS 1200 element that selects the network in which public switched telephone network (PSTN) 1232 (discussed below) breakout is to occur. If the breakout is to occur in the same network as the BGCF 1230, for example, then the BGCF 1230 selects a media gateway control function (MGCF) 1234 (also discussed below) that will be responsible for interworking with the PSTN 1232. The MGCF 1234 then receives the SIP signaling from the BGCF 1230.

The IMS 1200 also includes a subscriber location function (SLF) 1236. The SLF 1236 provides information about the HLR/HSS 1216 that is associated with a particular user profile. The SLF 1236 is generally implemented using a database. If the IMS 1200 contains more than one HLR/HSS 1216, then the I-CSCF 1224 and S-CSCF 1226 will communicate with the SLF 1236 to locate the appropriate HLR/HSS 1216 based on the user profile.

The IMS 1200 also includes the aforementioned TAS(s) 1228. As the name implies, TAS(s) 1228, sometimes known in a telephony-only context merely as an application server (AS), is a component used to provide telephony applications and additional multimedia functions. The TAS 1228 can include any entity in a telephone network that carries out functions that are not directly related to the routing of messages through the network, such as third-party application servers, the CAS 108, and other entities that provide downloads, streaming video, and other services. Such functions can also include, for example, in-network answering machines, automatic call forwarding, conference bridges and other types of applications. And, while shown as a single entity in FIG. 12, multiple TASs 1228 are generally used, with each TAS 1228 providing one or more separate services. Based on the services requested by the UE to the S-CSCF 1226, for example, the S-CSCF 1226 can establish sessions with one or more TASs 1228, generally with one TAS 1228 for each service.

The IMS 1200 also includes the MGCF 1234. The MGCF 1234 is a SIP endpoint that handles call control protocol conversion between SIP and ISDN user part (ISUP)/bearer-independent call control (BICC) and interfaces with the SAE GW 1218 over stream control transmission protocol (SCTP). The MGCF 1234 also controls the resources in a media gateway (MGW) 1238 across an H.248 interface. The MGW 1238 is a translation device or service that converts media streams between disparate telecommunications technologies such as POTS, SS7, next generation networks (2G 1202, 3G 1204, 4G 1206, and 5G 1208) or private branch exchange (PBX) systems.

Finally, the IMS 1200 also includes the PSTN 1232. The PSTN 1232 is the world's collection of interconnected voice-oriented public telephone networks, both commercial and government-owned. In some cases, the PSTN 1232 can also be referred to as the plain old telephone service (POTS). With respect to IP phones 1214, for example, the PSTN 1232 furnishes much of the Internet's long-distance infrastructure. Because internet service providers (ISPs) pay long-distance providers for access to their infrastructure and share the circuits among many users through packet-switching (discussed above), internet users avoid having to pay usage tolls to anyone other than their ISPs.

While several possible examples are disclosed above, examples of the present disclosure are not so limited. For instance, while the systems and methods above are discussed with reference to transferring video calls on cellular networks, the system could be used to provide enhanced video and/or audio call transfers for many types of networks including, for example, IP 1212, PSTN 1232, M2M, IoT networks, or future networks. Indeed, the systems and methods discussed herein could be used in the same, or a similar, manner to transfer video and audio calls on many kinds of devices that are capable of connecting to a variety of voice and data networks. In addition, while various functions are discussed as being performed on the UEs 102, 104, 106; the CAS 108; or the MRF 110, for example, other components, such as various network entities, could perform some, or all, of these functions without departing from the spirit of the invention.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A call application server (CAS) comprising:
a transceiver to send and receive at least one of wired or wireless transmissions;
memory storing computer-executable instructions; and
a processor in communication with at least the transceiver and the memory, the computer-executable instructions causing the processor to perform acts comprising:
receiving, with the transceiver, a first signal from a first user equipment (UE), the first UE connected on a first video call with a second UE, the first signal requesting to transfer the second UE to a second video call with a third UE;
sending, with the transceiver, a second signal to a media resource function (MRF) to cause the MRF to connect to the second UE;
sending, with the transceiver, a third signal to the third UE, the third signal including a first set of parameters, to cause the third UE to connect to the second video call with the second UE, wherein the MRF provides a video stream and an audio stream to the second UE; and
sending, with the transceiver, a fourth signal to cause the first UE to disconnect from the first video call.

2. The CAS of claim 1, wherein the first signal comprises an unattended transfer request.

3. The CAS of claim 1, the computer-executable instructions causing the processor to perform further acts comprising:
sending, with the transceiver, a fifth signal to cause the first UE to connect a third call to the third UE; and
receiving, at the transceiver, a sixth signal from the first UE to cause the CAS to send the third signal;
wherein the first signal comprises an attended transfer request; and
wherein the first UE sends the sixth signal at least partially in response to the first UE disconnecting from the third call.

4. The CAS of claim 1, wherein receiving the first signal from the first UE further comprises maintaining an open first video call with the first UE until the first UE is disconnected from the first video call.

5. The CAS of claim 1, wherein:
the third signal comprises a SIP INVITE; and
the first set of parameters comprises (Audio—SENDRECV; Video—SENDRECV).

6. The CAS of claim 1, the computer-executable instructions causing the processor to perform further acts comprising:
receiving, at the transceiver, a fifth signal from the third UE requesting that the second video call be downgraded to a third audio call; and
sending, with the transceiver, a sixth signal comprising a second set of parameters to the second UE to cause the second UE to disconnect from the MRF and to connect to the third audio call.

7. The CAS of claim 6, wherein:
the fifth signal comprises a SIP 200 OK; and
the second set of parameters comprises (Audio—SENDRECV; Video—DISABLED).

8. A method comprising:
receiving, with a transceiver of a call application server (CAS), a first signal from a first user equipment (UE) requesting to transfer a first video call between the first UE and a second UE to a second video call between the second UE and a third UE;
sending, with the transceiver, a second signal to a media resource function (MRF) to cause the MRF to connect to the second UE;
sending, with the transceiver, a third signal to the third UE including a first set of parameters to cause the third UE to connect to the second video call; and
sending, with the transceiver, a fourth signal to cause the MRF to disconnect from the second UE.

9. The method of claim 8, wherein sending the second signal further comprises sending the second signal to cause the MRF to connect to the first UE and put the first UE on video hold until the first UE is disconnected from the first video call.

10. The method of claim 8, wherein the second signal comprises a SIP INFO including at least a phone number or an internet protocol (IP) address associated with the second UE.

11. The method of claim 8, further comprising:
receiving, at the transceiver, a fifth signal from the third UE acknowledging the third signal; and
sending, with the transceiver, a sixth signal to the second UE to cause the second UE to disconnect from the MRF and connect to the third UE on the second video call.

12. The method of claim 8, wherein sending the fourth signal further comprises sending the fourth signal to the MRF to cause the second UE to connect to the second video call.

13. The method of claim 8, further comprising:
receiving, at the transceiver, a fifth signal from the third UE including a second set of parameters related to downgrading the second video call to a third audio call; and
sending, with the transceiver, a sixth signal to the second UE including the second set of parameters to cause the second UE to disconnect from the MRF and connect to the third UE on the third audio call.

14. The method of claim 13, further comprising:
receiving, at the transceiver, a seventh signal from the second UE acknowledging the sixth signal; and
sending, with the transceiver, an eighth signal to the third UE including information related to connecting to the second UE on the third audio call.

15. A first user equipment (UE) comprising:
a display including at least a call management graphical user interface (GUI);
a transceiver to send and receive at least one of wired or wireless transmissions;
memory storing computer-executable instructions including at least a call management graphical user interface (GUI); and
a processor in communication with at least the transceiver and the memory, the computer-executable instructions causing the processor to perform acts comprising:
  receiving, at the processor, a transfer input from the call management GUI to transfer a first video call between the first UE and a second UE to a second call between the second UE and a third UE;
  providing, on the call management GUI, one or more of a dialer or a contact input;
  receiving, at the processor, a number from the dialer or a contact from the contact input; and
  sending, with the transceiver, a first signal to a call application server (CAS), to cause the CAS to:
    send a second signal to a media resource function (MRF) requesting that the MRF connect to the second UE;
    send a third signal to the third UE requesting that the third UE connect to the second UE on the second call;
    wherein the MRF provides an audio stream and a video stream to the second UE; and
    send a fourth signal to the MRF to cause the MRF to disconnect from the second UE.

16. The first UE of claim 15, wherein:
the transfer input comprises a video call transfer input; and
the second call is a video call.

17. The first UE of claim 15, wherein:
the transfer input comprises an audio call transfer input; and
the second call is an audio call.

18. The first UE of claim 15, the computer-executable instructions further causing the processor to perform acts comprising:
receiving, at the processor, a first input from an attended transfer input on the call management GUI; and
sending, with the transceiver, a fifth signal to cause the CAS to connect the first UE to the third UE prior to sending the first signal.

19. The first UE of claim 15, the computer-executable instructions further causing the processor to perform acts comprising:
providing, on the call management GUI and prior sending the first signal, information about the first video call to be transferred as an attended call or the first video call to be transferred as an unattended call.

20. The first UE of claim 15, wherein:
the third signal comprises a SIP INVITE;
the third signal comprises a first set of parameters; and
the first set of parameters comprises (Audio—SENDRECV; Video—SENDRECV).

* * * * *